United States Patent
Hirai et al.

Patent Number: 5,216,531
Date of Patent: Jun. 1, 1993

[54] PROJECTION TYPE ACTIVE MATRIX POLYMER DISPERSED LIQUID CRYSTAL DISPLAY APPARATUS WITH PARTICLES OF LIQUID CRYSTAL MATERIAL RANDOMLY ORIENTED

[75] Inventors: Yoshinori Hirai; Tomoki Gunjima; Satoshi Niiyama; Yoshiharu Ooi, all of Yokohama, Japan

[73] Assignee: Asahi Glass Company Ltd., Tokyo, Japan

[21] Appl. No.: 748,841

[22] Filed: Aug. 23, 1991

[30] Foreign Application Priority Data

Aug. 28, 1990 [JP] Japan .................... 2-224360
Sep. 20, 1990 [JP] Japan .................... 2-248723

[51] Int. Cl.$^5$ .................... G02F 1/13; G02F 1/137
[52] U.S. Cl. .................... 359/52; 359/51; 359/93; 359/102
[58] Field of Search .................... 359/51, 52, 93, 102

[56] References Cited

U.S. PATENT DOCUMENTS

| | | | |
|---|---|---|---|
| 3,872,050 | 3/1975 | Benton et al. | 359/51 |
| 4,685,771 | 8/1987 | West et al. | 359/51 |
| 4,688,900 | 8/1987 | Doane et al. | 359/52 |
| 4,834,509 | 5/1989 | Gunjima et al. | 359/52 |
| 5,103,327 | 4/1992 | Hirai et al. | 359/51 |
| 5,113,270 | 5/1992 | Fergason | 359/51 |
| 5,150,232 | 9/1992 | Gunjima et al. | 359/51 |

FOREIGN PATENT DOCUMENTS 0359146  3/1990  European Pat. Off.

OTHER PUBLICATIONS

Molecular Crystals and Liquid Crystals, vol. 165, Dec. 1988, pp. 511-532, J. W. Doane, et al., "Polymer Dispersed Liquid Crystals for Display Application".
Society for Information Display International Syposium, May 24-26, 1988, pp. 227-230, J. Pirs, et al., "Low-Loss High-Intensity Color Projection".

*Primary Examiner*—William L. Sikes
*Assistant Examiner*—Anita Pellman Gross
*Attorney, Agent, or Firm*—Oblon, Spivak, McClelland, Maier & Neustadt

[57] ABSTRACT

An active matrix liquid crystal display element comprising an active matrix substrate having an active element for each electrode for picture element, a counter electrode substrate provided with a counter electrode and a liquid crystal polymer composite material in which a nematic liquid crystal having a positive dielectric anisotropy is dispersed and held in a polymer matrix, said liquid crystal polymer composite material being held between the active matrix substrate and the counter electrode substrate wherein the refractive index of the polymer matrix substantially agrees with the ordinary refractive index ($n_0$) of the liquid crystal used, characterized in that the refractive index anisotropy $\Delta n$ of the nematic liquid crystal used is 0.18 or higher, and the average particle diameter R($\mu$m) of the liquid crystal dispersed and held in the polymer matrix, the aspect ratio A in average of liquid crystal particles, and the specific dielectric anisotropy $\Delta\epsilon$, the elastic constant $K33(10^{-12}N)$ and the viscosity $\eta$ (cSt) of the liquid crystal satisfy the following relations:

$$3(K33/\eta)^{0.5} > R/A > 0.7(K33/\Delta\epsilon)^{0.5} \quad (1)$$

and $$1.3 < A < 2.3 \quad (2)$$

and that in a plane cut in the direction perpendicular to the surface of the electrodes on the liquid crystal polymer composite material, the direction of the long axis of each liquid crystal particle is substantially random in the two-dimensional space.

19 Claims, 3 Drawing Sheets

PROJECTION TYPE ACTIVE MATRIX POLYMER DISPERSED LIQUID CRYSTAL DISPLAY APPARATUS WITH PARTICLES OF LIQUID CRYSTAL MATERIAL RANDOMLY ORIENTED

The present invention relates to an active matrix liquid crystal display element having an active element for each picture element electrode and a projection type active matrix liquid crystal display apparatus.

In recent years, liquid crystal displays have been widely used for personal word processors, hand-held computers, portable TV sets and so on, taking the advantages of low power consumption, low driving voltage and so on. Of the liquid crystal displays, active matrix liquid crystal display elements having an active element for each picture element electrode have particularly been noted and developed.

As such liquid crystal display elements, there was a proposal on liquid crystal display elements in which a dynamic scattering mode (DSM) liquid crystal is used. However, the liquid crystal display element of this type had a disadvantage of large current consumption because a high value of electric current passed in the DSM liquid crystal. Now, liquid crystal display elements in which a twist nematic (TN) type liquid crystal is used have been widely used. For instance, portable TVs have been widely commercialized. Since the TN type liquid crystal display element has a very small leak current and a small power consumption, it is suitable for using a battery as a power source.

When the active matrix liquid crystal display element is used for DS mode, the leak current of the liquid crystal itself is large. Accordingly, it was necessary to provide a large storage capacitance in parallel to each picture element, and the power consumption of the liquid crystal display element itself is large.

In the TN mode, since a leak current in the liquid crystal itself is very small, it is unnecessary to provide a large storage capacitance and the power consumption of the liquid crystal display element itself can be small.

In the TN mode liquid crystal, however, there is problem that the transmittance of light is small because two polarization plates are required. In particular, when a color filter is used for obtaining a colored display, only several percents of incident light can be utilized. It is, therefore, necessary to use a strong light source, as a result of increasing power consumption.

Further, the TN mode liquid crystal display element has disadvantages of requiring a very strong light source for projecting a picture image on a projection screen, difficulty in obtaining a high contrast on the projection screen, and adverse effect to the liquid crystal display element due to heat from the light source.

In order to solve the problems in the TN mode liquid crystal display element, there is proposed such mode that a liquid crystal polymer composite material in which a nematic liquid crystal is dispersed and held in a polymer matrix is used, and a low voltage such as 10 V or lower is sufficient to drive it by utilizing the scattering-transparent characteristics.

However, in the conventional liquid crystal composite material, there was hysteresis in the voltage-transmittance characteristics, that is, there was a problem that the transmittance during the increase of voltage is different from that during the decrease of voltage. Accordingly, there was a problem of a phenomenon of image-sticking wherein a picture image which had appeared in the display just before the changing of picture remained in the present display.

Further, when it was necessary to obtain a colored display by using a plurality of the active matrix liquid crystal display elements each having the same construction, the chromatic balance in the colored display was insufficient, and a specified color became conspicuous because the transmission characteristics are different among colors. Thus, there was a problem that it was difficult to obtain a clear color display.

The present invention is to eliminate the disadvantages of the conventional liquid crystal display element and conventional projection type active matrix liquid crystal display apparatus.

As an aspect of the present invention, there is provided an active matrix liquid crystal display element comprising an active matrix substrate having an active element for each electrode for picture element, a counter electrode substrate provided with a counter electrode and a liquid crystal polymer composite material in which a nematic liquid crystal having a positive dielectric anisotropy is dispersed and held in a polymer matrix, said liquid crystal polymer composite material being held between the active matrix substrate and the counter electrode substrate wherein the refractive index of the polymer matrix substantially agrees with the ordinary refractive index ($n_0$) of the liquid crystal used, characterized in that the refractive index anisotropy $\Delta n$ of the nematic liquid crystal used is 0.18 or higher, and the average particle diameter $R(\mu m)$ of the liquid crystal dispersed and held in the polymer matrix, the aspect ratio A in average of liquid crystal particles, and the specific dielectric anisotropy $\Delta \epsilon$, the elastic constant $K33(10^{-12}N)$ and the viscosity $\eta$ (cSt) of the liquid crystal satisfy the following relations:

$$3(K33/\eta)^{0.5} > R/A > 0.7(K33/\Delta\epsilon)^{0.5} \tag{1}$$

and $$1.3 < A < 2.3 \tag{2}$$

and that in a plane cut in the direction perpendicular to the surface of the electrodes on the liquid crystal polymer composite material, the direction of the long axis of each liquid crystal particle is substantially random in the two-dimensional space.

As another perspect of the present invention, there is provided a projection type active matrix liquid crystal display apparatus comprising a plurality of color light sources, a plurality of active matrix liquid crystal display elements for receiving light from each of the color light sources and a projection optical system which synthesizes and projects light emitted from the active matrix liquid crystal display elements, characterized in that each of the active matrix liquid crystal display elements comprises an active matrix substrate having an active element for each electrode for picture element, a counter electrode substrate provided with a counter electrode and a liquid crystal polymer composite material in which a nematic liquid crystal having a positive dielectric anisotropy is dispersed and held in a polymer matrix, said liquid crystal polymer composite material being held between the active matrix substrate and the counter electrode substrate provided with the counter electrode, and the refractive index of the polymer matrix substantially agreeing with the ordinary refractive index ($n_0$) of the liquid crystal used; that the average particle diameter $R_x(\mu m)$ of the liquid crystal corresponding to each color, which is dispersed and held in the polymer matrix, the aspect ratio A in average of liquid crystal particles, the specific dielectric anisotropy $\Delta\epsilon_x$, the elastic constant $K33_x(10^{-12}N)$, the viscosity $\eta_x$ (cSt) and the refractive index anisotropy $\Delta n_x$ of the liquid crystal, the gap $d_x$ (μm) between the counter electrode and the picture element electrode, and the dominant wavelength $\lambda_x$ (μm) of each of the colors satisfy the following relations:

$$3(K33_x/\eta_x)^{0.5} > R_x/A_x > 0.7(K33_x/\Delta\epsilon_x)^{0.5} \tag{1A}$$

and $$1.3 < A_x < 2.3 \tag{2A}$$

wherein at least a pair of the active matrix liquid crystal display elements satisfies the relations:

$$(\Delta n_i \cdot R_i)/(A_i \cdot \lambda_i) \approx (\Delta n_j \cdot R_j)(A_j \cdot \lambda_j) \tag{8}$$

and $$d_i/R_i \approx d_j/R_j \tag{9}$$

where $i \neq j$, and i and j represent either color, or it satisfies the relation:

$$\Delta n_i \cdot d_i^2/\lambda_i \approx \Delta n_j \cdot d_j^2/\lambda_j \tag{10}$$

where i and j are described above; and that in a plane cut in the direction perpendicular to the surface of the electrodes on the liquid crystal polymer composite material, the direction of the long axis of each liquid crystal particle is substantially random in the two-dimensional space.

In the projection type active matrix liquid crystal display apparatus of the present invention, since an active matrix liquid crystal display element in which a liquid crystal polymer composite material capable of electrically controlling a light scattering state and a light transmission state is used as a liquid crystal material which is interposed between the active matrix substrate and the counter electrode substrate, polarization plates are no more necessary, and the transmittance of light at the time of transmission can be greatly improved.

Further, since the average particle diameter $R_x$ (μm) of the liquid crystal in the liquid crystal polymer composite material and the gap $d_x$ (μm) between the counter electrode and the picture element electrodes are determined for each hue, a display having good chromatic balance, a high contrast ratio and brightness can be obtained when the colors are mixed in a projection type display.

Further, since orientation treatment indispensable for the TN type liquid crystal display element is not necessary and problems such as the destruction of the active elements caused by the static electricity generated upon treatment can also be avoided, production yield of the liquid crystal display element can be improved remarkably.

Furthermore, since the liquid crystal polymer composite material is in a state of film after curing, it can reduce such problems as short-circuiting between the substrates due to the pressure applied thereto and the destruction of the active elements caused by the movement of the spacers.

Further, since the specific resistivity of the liquid crystal polymer composite material is same as that of the TN mode, it is not necessary to dispose a large storage capacitance on each picture element as in the case of the DSM, so that the design for the active element is easy and the electric power consumption by the liquid crystal display element can be kept low. Accordingly, since the material can be produced by merely eliminating the step of forming an oriented film from the production steps for the conventional TN mode crystal display element, the production is easy.

The specific resistivity of the liquid crystal polymer composite material is, preferably, not less than $5 \times 10^9$ Ω cm, and more preferably, not less than $10^{10}$ Ω cm in order to minimize the voltage drop due to leak current etc., in which there is no requirement for providing a large storage capacitance on each of the picture element electrodes.

As the active element, there may be used, for example, a transistor, a diode, non-linear resistor element, and two or more of active elements may be disposed to one picture element if necessary. The liquid crystal polymer composite material is put between an active matrix substrate which is provided with active element and a picture element electrode connected therewith and a counter electrode substrate provided with a counter electrode to thereby constitute a liquid crystal display element.

The liquid crystal display element of the present invention can be used not only as a direct view type display element but also a projection type display element. When the liquid crystal display element of the present invention is used as the direct view type display element, a display apparatus may be constituted in combination with a backlight, a lens, a prism, a mirror, a diffusion plate, a light absorbing material, a color filter and so on in accordance with the display characteristics which are desired to obtain.

The liquid crystal display element of the present invention is, in particular, suitable for a projection type display apparatus, and the projection type liquid crystal display apparatus can be constituted by combining the liquid crystal display element with a projection light source, a projection optical system and so on.

As the projection light source and the projection optical system, a conventional projection light source and a conventional projection optical system (such as a lens or the like) may be used, wherein the liquid crystal display element is normally disposed between the projection light source and the projection lens.

In the projection type active matrix liquid crystal display apparatus of the present invention, which is used for a multi-color display or a full-color display, a plurality of color light sources and a projection optical system are used, which may be conventional projection light sources and a conventional projection optical system such as a lens. Generally, a plurality of the liquid crystal display elements are arranged in correspondence to each color light source so that an image is synthesized and projected on a screen through the liquid crystal display elements.

The color light source may be a plurality of light sources which are used for different colors, or light from a single light source may be subjected to color splitting in order to use a single color light. The light emitted from the color light source is received in the liquid crystal display element. In the present invention, a plurality of active matrix liquid crystal display elements are used wherein the characteristics of each of the display elements are adjusted for the colors of color light sources. The lights emitted from the active matrix liquid crystal display elements are mixed and projected, whereby a bright projection image having good chromatic balance and a high contrast ratio is obtainable.

In the present invention, since such a liquid crystal display element that it comprises an active matrix substrate provided with an active element for each picture element electrode, a counter electrode substrate provided with a counter electrode and a transparent-scattering type liquid crystal polymer composite material which is interposed between the active matrix substrate and the counter electrode substrate and in which a nematic liquid crystal having a positive dielectric anisotropy is dispersed and held in a polymer matrix, and the refractive index of the polymer matrix substantially agrees with the ordinary refractive index ($n_0$) of the liquid crystal used, is used as the liquid crystal display element, a display having a high contrast and brightness can be easily obtained.

In the present invention, a liquid crystal polymer composite material comprising a polymer matrix having a large number of fine holes and a nematic liquid crystal having a positive dielectric anisotropy filled in the fine holes. The liquid crystal polymer composite material is preferably such one that the refractive index of the polymer matrix substantially agrees with the ordinary refractive index ($n_0$) of the liquid crystal used, and the refractive index anisotropy $\Delta n$ of the liquid crystal used is 0.18 or more. The liquid crystal polymer composite material is put between the active matrix substrate and the counter electrode substrate to thereby constitute the liquid crystal display element. When a voltage is applied across the electrodes of the liquid crystal display element, the refractive index of the liquid crystal is changed, and the relation between the refractive index of the polymer matrix and the refractive index of the liquid crystal is changed. Namely, when the refractive indices of the both members are in agreement with each other, a state of transmission is provided, and when not, a state of scattering is provided.

The liquid crystal polymer composite material comprising the polymer matrix having a large number of fine holes and the liquid crystal filled in the fine holes has such a structure that the liquid crystal is sealed in vacuoles such as microcapsules wherein the individual microcapsules may not be completely independent or the individual vacuoles may be communicated with each other through fine gaps like a porous material.

The liquid crystal polymer composite material used for the liquid crystal display element according to the present invention can be prepared by mixing a nematic liquid crystal and a material for forming the polymer matrix into a solution or a latex, by curing the solution or latex by the application of light or heat, or by removing solvent or by subjection it to reactive curing thereby separating the polymer matrix and dispersing the liquid crystal into the polymer matrix.

Use of the photo-curable or heat-curable type polymer is preferred since it can be cured in an enclosed system.

In particular, use of a photo-curable type polymer is preferred since it can be cured in a short period of time with little influence of heat.

As a specific production method, the cell may be formed by using a sealing material, uncured mixture of the nematic liquid crystal and the curable compound is injected from the injection port in the same manner as in the conventional nematic liquid crystal display element, and after sealing the injection port, they can be cured by light irradiation or heating.

The liquid crystal display element according to the present invention may also be prepared without using a sealing material, for example, by supplying an uncured mixture of the nematic liquid crystal and the curable compound on a substrate provided with a transparent electrode as a counter electrode, overlaying, on that substrate, an active matrix substrate having an active element for each picture element electrode and then curing the material by means of light-irradiation or the like.

The periphery of the display element assembly may be sealed by coating the sealing material. According to this production method, since it is only required to supply the uncured mixture of the nematic liquid crystal and the curable compound by means of coating such as roll coating, spin coating, printing or by the method of using a dispenser or the like, the injection step is simple and the productivity is extremely high.

Further, the uncured mixture of the nematic liquid crystal and the curable compound may be incorporated with spacers for controlling the inter-substrate gap such as ceramic particles, plastic particles or glass fibers, pigments, dyes, viscosity controllers or any other additives which does not adversely influence to the performance of the liquid crystal display element of the present invention.

During the curing step of the liquid crystal display element of the present invention, if the element is cured under the condition that a sufficiently high voltage is applied to only a specified portion, it is possible to render that portion to be a state of normally light transmittance. Accordingly, when a fixed display is desired, such normally light transmittance portion may be formed.

In the liquid crystal display element using the liquid crystal polymer composite material, higher transmittance in the light transmission state is preferable and the haze value in the light scattering state is preferably not less than 80%.

In the present invention, the refractive index of the polymer matrix (after curing) agrees with the ordinary refractive index ($n_0$) of the liquid crystal used, in a state of applying voltage.

Thus, light is transmitted when the refractive index of the polymer matrix agrees with the refractive index of the liquid crystal, while the light is scattered (opaque) when they do not agree with each other. The scattering property of the element is higher than that of the liquid crystal display element in the conventional DS mode and a display having a high contrast ratio can be obtained.

An object of the present invention is to provide the optimum structure of a multi-color or a full-color projection type active matrix liquid crystal display apparatus in which an active matrix liquid crystal display element which holds the liquid crystal polymer composite material.

Namely, the active matrix liquid crystal display element wherein it provides a quick response in a gray scale display while it has good chromatic balance, a high transmittance at the time of transmission, exhibits high scattering property (light-shielding property) at the time of scattering, brightness and a high contrast ratio, and there is no image-sticking.

As factors for determining the electro-optical characteristics of the active matrix liquid crystal display element using the liquid crystal polymer composite material, there are the refractive index (ordinary refractive index $n_0$, extraordinary refractive index $n_e$), the specific dielectric coefficient ($\epsilon //$, $\epsilon \perp$, where $//$ and $\perp$ respectively represent parallel and vertical to the axis of liquid crystal molecules), the viscosity $\eta$ and the elastic constant K33 of the liquid crystal used, the refractive index np, the specific dielectric coefficient $\epsilon p$ and the elastic constant of the polymer used, the average particle diameter R and the volume fraction $\Phi$ of the liquid crystal dispersed and held in the polymer matrix, the gap d between the both electrode substrates (the thickness of the liquid crystal polymer composite material), the maximum effective voltage V applied to the liquid crystal polymer composite material at the picture element portions by the active elements, etc.

In this specification, the diameter of the average particle diameter R of the liquid crystal means the maximum diameter of the particles when the liquid crystal comprises independent particles or particles which are partially connected with each other. On the other hand, the diameter means the maximum diameter of a portion where the orientation of the directors of the liquid crystal has mutual co-relation when the liquid crystal assumes a structure in which the major part has mutual connection.

It is preferable that the liquid crystal dispersed and held in the polymer matrix consists of independent particles or particles having partial communication because high scattering performance and high transmittance performance, when the liquid crystal is driven at a low voltage, can be effectively obtained without inconsistency. A scattering phenomenon takes place at the boundary surface of the liquid crystal and the polymer. Accordingly, the scattering performance is improved as the surface area of the boundary surface is large. In order to increase the surface area of the boundary surface with the optimum particle diameter of the liquid crystal, an amount of liquid crystal should be increased independent of and separate from the polymer. Namely, it is important to increase the density of liquid crystal particles. However, when the amount of liquid crystal is increased separate from the polymer, a phenomenon of liquid crystal particles being connected with each other is found, and finally the liquid crystal assumes a structure in which the entire part of the particles is connected. This results in the missing of the boundary surface of the liquid crystal separated from the polymer thereby reducing the scattering property.

Further, it is important for individual particles of the liquid crystal held in the polymer matrix to have the substantially same driving electric field in order to reduce the driving voltage. For this, it is advantageous that there is a clear interface between the liquid crystal and the polymer. The missing of the interface results in the dispersion of the driving electric field to thereby apt to reduce the contrast ratio and the increase of the driving voltage. Accordingly, the liquid crystal particles dispersed and held in the polymer are preferably independent particles which exist at a high density, or particles having partial communication.

The electro-optical characteristics for the active matrix liquid crystal display element using the liquid crystal polymer composite material according to the present invention is desirable to have high scattering property when no electric field is applied and to have high transmittance when an electric field is applied. Namely, it should have a high contrast ratio in displaying, a quick response characteristic in gray scale displaying, and a display free from residual image. When a projection type display is carried out by using such liquid crystal display element, a display of high brightness and high contrast ratio is obtainable.

In order to obtain the above-mentioned display, it is necessary that the above-mentioned factors have the optimum relations.

As particularly important factors for determining the electro-optical characteristics of the active matrix liquid crystal display element among the above-mentioned factors, there are the refractive index of the liquid crystal used (refractive index anisotropy $\Delta n = n_e - n_0$), the specific dielectric anisotropy $\Delta \epsilon$, the viscosity $\eta$, the elastic constant K33, the average particle diameter R and the distribution of particle diameter of the liquid crystal, the aspect ratio A of liquid crystal particle, and the gap d between the both electrode substrates. When the optimum display is desired, the average particle diameter R of the liquid crystal and the gap d between the electrode substrates are determined for each of the liquid crystal display elements in correspondence to the wavelength $\lambda$ of the predominant wave of the color light sources.

The refractive index anisotropy $\Delta n$ ($= n_e - n_0$) of the liquid crystal used contributes the scattering property when there is no electric field. Accordingly, it is preferable that the value of the refractive index anisotropy $\Delta n$ ($= n_e - n_0$) should be larger in order to obtain high scattering property. Specifically, it is preferable to be $\Delta n > 0.18$, especially, $\Delta n > 0.22$. Further, the ordinary refractive index $n_0$ of the liquid crystal used preferably substantially agrees with the refractive index np of the polymer matrix. In this case, high transmittance property can be obtained when an electric field is applied. Specifically, it is preferable to satisfy the relation of $n_0 - 0.03 < n_p < n_0 + 0.05$.

The most important object of the present invention is to obtain the active matrix liquid crystal display element using the liquid crystal polymer composite material which reduces a phenomenon of image-sticking due to hysteresis (occurrence of residual image remaining for a relatively long time).

When the liquid crystal polymer composite material is driven in a static state, it is driven either in an OFF state or an ON state having a sufficiently high voltage (not less than the saturated voltage). Accordingly, the liquid crystal polymer composite material has a response time less than several tens msec, and therefore, it is generally suitable for a high speed display. However, a voltage lower than the saturated voltage can also be used in a gray scale display in order to obtain a half tone display. In this case, the response time is slower than that at the driving in the static state. The response time in the gray scale display apt to be slower in the display with use of a low voltage (dark display). In particular, the change from the OFF state to a state of low transmittance is slowest, and the response time in this condition is more than several tens times as slow as the response time at the static driving.

The average particle diameter R of the liquid crystal dispersed and held in the polymer matrix is a very important factor, which contributes the scattering property when no electric field is applied and the operation of the liquid crystal when an electric field is applied.

As important factors for determining the response in the gray scale display, there are the average particle diameter R and the shape of the liquid crystal held in the polymer, the specific dielectric anisotropy $\Delta\epsilon$, the elastic constant K33 and the viscosity $\eta$ of the liquid crystal used.

A display without any residual image even in the gray scale display wherein a single kind of liquid crystal is used, namely, a single element is used, can be obtained when the average particle diameter R ($\mu$m) of the liquid crystal dispersed and held in the polymer matrix, the aspect ratio A of liquid crystal particle, and the specific dielectric anisotropy $\Delta\epsilon$, the $\eta$viscosity $\eta$(cSt) and the elastic constant K33($10^{-12}$N) of the liquid crystal satisfy the following relation:

$$3(K33/\eta)^{0.5} > R/A > 0.7(K33/\Delta\epsilon)^{0.5} \quad (1)$$

and more preferably, $$(\Delta n^2 \cdot \Delta\epsilon)/(K33 \cdot \eta) > 0.0011 \quad (4)$$

Further in a case of using a plurality kinds of liquid crystal to prepare a plurality of elements, the above-mentioned physical properties should satisfy the relation for each color:

$$3(K33_x/\eta_x)^{0.5} > R_x/A_x > 0.7(K33_x/\Delta\epsilon_x)^{0.5} \quad (1A)$$

and more preferably, $$(\Delta n_x^2 \cdot \Delta\epsilon_x)/(K33_x \cdot \eta_x) > 0.0011 \quad (4A)$$

In the range described in the equation (1) or (1A), a torque acting on the liquid crystal at each voltage in the gray scale display is balanced whereby a display without any residual image is obtainable, and the electric field needed to drive the liquid crystal can be suppressed to be low. Thus, when the range of the equation (4) or (4A) is satisfied, a great advantage can be provided. Especially, when the value of the equation (4) or (4A) is determined to be more than 0.0014, a greater advantage is obtainable. The above-mentioned physical values of the liquid crystal are values in terms of room temperature.

The symbols $\Delta n_x$, $K33_x$, $\eta_x$, $R_x$ and $A_x$ in the above-mentioned equation, "x" represents color. When three colors are used, "x" represents anyone of R, G and B. This definition applies throughout this specification.

In a conventional liquid crystal polymer composite material, there is hysteresis in the voltage-transmittance which caused a problem in the gray scale display. The hysteresis is such phenomenon that the transmittance of light in the stage of increasing voltage is different form the transmittance of light in the stage of decreasing the voltage. If the hysteresis exists, information of the previously displayed picture remains in the gray scale display. Namely, there takes place the phenomenon of image-sticking, which invites the reduction of picture quality.

As a reason of the hysteresis being in the liquid crystal polymer composite material, there is the construction of the liquid crystal polymer composite material wherein the liquid crystal is dispersed and held in the polymer matrix. Namely, interaction of mutual liquid crystal particles which separately exist in the polymer matrix produces the hysteresis. The magnitude of the hysteresis is determined by the elastic energy stored in the liquid crystal which is held in the polymer matrix, an electric energy given by an electric field applied from outside and the energy by the interaction of the liquid crystal particles which separately exist in the polymer matrix.

Accordingly, it is possible to reduce the hysteresis by optimizing balance of the energies, whereby an excellent display without image-sticking can be obtained even in the gray scale display.

It is an object of the present invention to provide a liquid crystal display element having a high contrast ratio, high brightness, excellent response characteristics and capable of reducing the hysteresis. Further, the present invention is to obtain an active matrix liquid crystal display element which can be driven by a conventional TN type active element and a conventional driving circuit.

The important factors determining the balance of the energies are the average particle diameter R of the liquid crystal dispersed and held in the polymer matrix, the shape of the liquid crystal particles, the specific dielectric anisotropy $\Delta\epsilon$, the viscosity $\eta$ and the elastic constant K33 of the liquid crystal, the dielectric coefficient $\epsilon$p of the polymer matrix, etc. In the optimization for the above-mentioned purposes, it is important to consider that the balance of the energies is closely related to the voltage-transmittance characteristics of the display element and the dynamic characteristics (response characteristics) of the liquid crystal.

The average particle diameter R of the liquid crystal is an important factor and it is closely related to the scattering property, the response characteristics, the driving electric field and so on. When R is made large, the electric field needed to drive becomes small, while the response characteristics becomes slow. On the other hand, when R is made small, the elastic energy stored per unit liquid crystal quantity becomes large to thereby increase the response speed. However, it requires a large electric field for driving.

The viscosity $\eta$ and specific dielectric anisotropy $\Delta\epsilon$ of the liquid crystal are also factors which deeply concern the response characteristic. Smaller the viscosity is or larger the specific dielectric anisotropy is, quicker the response speed is. Further, $\Delta\epsilon$ concerns an electric field needed to drive. Larger $\Delta\epsilon$ is, smaller the electric field required.

The elastic constants of the liquid crystal determine an elastic energy accumulated in the liquid crystal. In the liquid crystal polymer composite material, a bend energy due to K33 particularly performs a great role, and deeply concerns the response characteristics and the driving characteristics, i.e. the elastic torque acting on the liquid crystal.

A greater value of the elastic constant K33 is advantageous to reduce the hysteresis. In this case, an improvement in the response characteristics is expected. However, when the value of K33 is excessively high, increase of the driving electric field is caused. Accordingly, the value of K33 should be selected in consideration of the balance of the other physical properties of the liquid crystal (for instance, $\Delta n$, $\Delta\epsilon$, $\eta$ etc.).

The shape of the liquid crystal particles is an important factor to reduce the hysteresis. Namely, since strain in the liquid crystal particles held in the polymer matrix can change the elastic energy accumulated per unit liquid crystal quantity, it is possible to control energy balance by controlling the strain in the liquid crystal particles.

In determining the shape of the liquid crystal particles, a shape having complicated convex-concave portions provides good response characteristics while it requires a very high driving electric field. Accordingly, an ellipsoidal shape is preferred. The average particles diameter means the diameter a of liquid crystal particles in the direction of the long axis (i.e. the maximum diameter) which is weighted by the volume. The aspect ratio A is obtained by dividing the diameter a of the long axis by the diameter b of the short axis (i.e. a/b).

When the aspect ratio is small ($A < 1.3$), increment in the elastic energy which is determined by the shape of the liquid crystal particles is small, whereby contribution to the total energy balance is not large. Accordingly, it is difficult to reduce the hysteresis although the driving electric field is small. The increment of the elastic energy becomes large as the aspect ratio becomes larger, whereby the hysteresis is reduced and the response speed becomes high.

However, as the aspect ratio A is made larger, the electric field required for driving becomes high. Moreover, when the aspect ratio A is relatively high, there may cause the reduction of contrast ratio due to the reduction of the scattering property. Accordingly, the optimum range of the aspect ratio A should be determined in consideration of the response characteristics and the driving characteristics. Conditions obtainable from the above-mentioned standpoints are described below.

In a case that a single kind of liquid crystal is used, namely, when a single element is used:

$$3(K33/\eta)^{0.5} > R/A > 0.7(K33/\Delta\epsilon)^{0.5} \quad (1)$$

and $$1.3 < A < 2.3 \quad (2)$$

Further, in a case that a plurality of elements are used so that plural kinds of liquid crystal are used, the following equations should be satisfied for each color:

$$3(K33x/\eta x)^{0.5} > Rx/Ax > 0.7(K33x/\Delta\epsilon x)^{0.5} \quad (1A)$$

and $$1.3 < Ax < 2.3 \quad (2A)$$

In the range as expressed the above-equations (1) and (2), or (1A) and (2A), the liquid crystal display element having balanced response characteristics and driving characteristics, and capable of reducing the hysteresis, can be obtained.

The aspect ratio is determined in consideration of the hysteresis, the driving voltage, the response characteristics, the wavelength of light and so on. When a plurality of color light sources are used, the aspect ratio may be same for each of the color sources, or the aspect ratio may have different values. Since the hysteresis tends to be large at the side of long wavelength, it is preferable that the aspect ratio used at the side of long wavelength has a larger value when the aspect ratio has different values.

In a case that different kinds of liquid crystal are used for different colors, tendency of increasing the hysteresis at the long wavelength side can be suppressed by using liquid crystal having a larger value of $\Delta n$ at the long wavelength side. Accordingly, it is possible to change the aspect ratio in consideration of the liquid crystal used, the wavelength of light, the driving voltage and so on.

In the present invention, it is important that the liquid crystal particles have an aspect ratio and are in a non-spherical shape, and the direction of the long axis of the liquid crystal particles of a non-spherical shape has a specified distribution. Namely, in the present invention, the long axis of each liquid crystal particle is in substantially random in the two-dimensional space in a plane cut in the vertical direction to the surface of electrode on the liquid crystal polymer composite material.

FIG. 5 is a perspective view showing the state of the liquid crystal particles whose long axis directs substantially random in the two-dimensional space, and FIG. 6 is a cross-sectional view of the liquid crystal polymer composite material.

In FIG. 5, reference numerals 41, 42 designate substrates, numerals 43, 44 designate electrodes and numeral 45 designates a liquid crystal polymer composite material. Numeral 46 designates a plane cut in the vertical direction to the electrode surfaces of the material. FIG. 6 shows the cut surface 46 in the vertical direction to the electrode surfaces, wherein numerals 53, 54 designate electrodes, numeral 55 designates a liquid crystal polymer composite material, numeral 57 designates a single liquid crystal particle, numeral 58 designates the direction of the long axis of the single liquid crystal particle and numeral 59 designates the direction perpendiculars the electrode surfaces. Symbol $\theta$ designates the angle formed between the direction of the long axis of the liquid crystal particle and the direction 59 perpendicular to the electrode surfaces.

In the present invention, the angle $\theta$ directs in the substantially random direction in this cross-sectional plane. In this specification, it is enough that the "random direction" means that the angle $\theta$ of the long axis of each of the liquid crystal particles is in a random direction in a macroscopic view in a single picture element which normally has about 50 $\mu$m–300 $\mu$m square. A more preferred state is such that the angle $\theta$ of the long axis of each of the particles is randomly arranged in an area smaller than several $\mu$m in the picture element, i.e. in a range smaller than about 10 time as the wavelength of light used. When the liquid crystal polymer composite material consists of a plurality of laminated layers, each of the laminated layers may have different angle of inclination wherein, for instance, the direction of the long axis of the liquid crystal particles are all inclined at 30° in the first layer, and the direction of the long axis of the liquid crystal particles are all inclined at 90° in the second layer. Namely, the liquid crystal particles with the direction of the long axis are substantially random in the plane perpendicular to the electrode surfaces of the liquid crystal polymer composite material.

However, it is very difficult to obtain a well controlled angle of inclination when the composite material is actually manufactured, and a truly random state wherein the long axis of the liquid crystal particles directs various directions is very effective in the present invention (unlike the structure of the liquid crystal polymer composite material comprising a plurality of laminated layers each having inclination angels as a unit of 30°.

Thus, the phenomenon of image-sticking due to the hysteresis can be greatly reduced by providing a substantially random state in the two-dimensional space in a plane cut in the perpendicular direction to the electrode surfaces of the liquid crystal polymer composite material.

Further, in the present invention, it is preferable to form a substantially random state of the direction of the long axis of the liquid crystal particles in the three-dimensional space (including the direction of depth in FIG. 6), whereby the quantity of transmitting light can correctly be controlled when incident light is random polarization. This feature is important to obtain a bright display without using the polarization plates which is the greatest advantage when the liquid crystal display element of the present invention is used for a projection type display apparatus. When the incident light has a certain polarization, the random state should be formed in the two-dimensional space in a plane cut in the perpendicular direction to the electrode surfaces so as to be most sensitive to the direction of polarization.

The optimum region of R/A is determined depending on the static energy and the elastic energy of the liquid crystal and a balance of torque acting on the liquid crystal. The upper limit of R/A to obtain good response characteristics without causing any trouble of display is expressed by $3(K33/\eta)^{0.5}$ and the lower limit is expressed by $0.7(K33/\Delta\epsilon)^{0.5}$.

The elastic constant of the liquid crystal determines an elastic energy to be accumulated in the liquid crystal. A bend energy derived from the elastic constant K33 particularly greatly functions in the liquid crystal polymer composite material, and the bend energy deeply concerns with the response characteristics and the driving characteristics, i.e. the elastic torque acting on the liquid crystal. The specific dielectric anisotropy is concerned with the electric torque acting on the liquid crystal, i.e. the electric field needed for driving. The viscosity of the liquid crystal concerns with a viscous torque acting on the liquid crystal. The above-mentioned relations have the optimally balanced torques. In this range, response characteristics suitable for displaying moving pictures in the gray scale display can be obtained with use of a relatively low electric field. When a projection type active matrix liquid crystal display apparatus in which a plurality of color light sources and a plurality of active matrix liquid crystal display elements are used and picture images produced from the plural active matrix liquid crystal display elements are synthesized and projected, is used, it is preferred that each of the active matrix liquid crystal display elements satisfies the equation (4) in order that the display elements can be driven by the application of a relatively low electric field without causing a residual image in the half tone.

Accordingly, it is important that the refractive index anisotropy $\Delta n_x$, the specific dielectric anisotropy $\Delta\epsilon_x$, the bend elastic constant $K33_x(10^{-12}N)$, the viscosity $\eta_x$ (cSt), the average particle diameter $R_x$ ($\mu m$) of the liquid crystal, and the aspect ratio $A_x$ of the liquid crystal particles in each display elements satisfy the equation as follows:

$$3(K33_x/\eta_x)^{0.5} > R_x/A_x > 0.7(K33_x/\Delta\epsilon_x)^{0.5} \qquad (1A)$$

In order to achieve a high contrast ratio, the scattering property at an OFF state should be large. The scattering property per unit quantity of operable liquid crystal in the liquid crystal polymer composite material is determined by $R_x \cdot \Delta n_x/\lambda_x$=the dominant wavelength of each color) Accordingly, the element of each color should satisfy the following relation:

$$0.2 < R_x \Delta n_x < 0.7 \qquad (3A)$$

Although the response speed becomes fast if the average particle diameter $R_x$ of the liquid crystal display element assumes a value smaller than the value in the range as described in the equation (3A), the scattering property per unit quantity of operable liquid crystal will decrease, and the electric field necessary for driving the element becomes high. On the contrary, although it is possible to drive the liquid crystal display element with a low electric field if the average particle diameter $R_x$ is greater than the value in the range described in the equation (3A), the scattering property per unit quantity of operable liquid crystal will decrease, and the response speed becomes slow. In a case that a single kind of liquid crystal is used for a single cell, the above-mentioned equation (3A) is expressed as follows:

$$0.2 < R \cdot \Delta n < 0.7 \qquad (3)$$

It is preferable that the particle diameter of the liquid crystal is uniform. If there is a distribution in the particle diameter, larger liquid crystal particles reduce the scattering property and smaller liquid crystal particles raises the electric field for driving, with the result of inviting the raise of driving voltage and the reduction of contrast. The dispersion $\sigma$ of the particle diameter is preferably not less than 0.25 times as the average particle diameter, more preferably, not less than 0.15 times. The above-mentioned average particle diameter and dispersion are respectively volume-weighed values.

The gap d between the electrode substrates is also an important factor. When d is made larger, the scattering property when no voltage is applied is improved. However, when d is excessively large, a high voltage is required in order to achieve a sufficient transparency when an electric field is applied, which in tern causes an increase of consumption power and incapability of using conventional active element and driving IC for TN devices. On the contrally, when d is made smaller, a high transparency is obtainable at a low voltage while the scattering property when no electric field is formed decreases. Accordingly, it is desirable that the product $A \cdot d$ of d ($\mu m$) and the aspect ratio A satisfies the following relation in order to satisfy both the scattering property when no electric field is applied and a high transparency when an electric field is applied:

$$4R_x < A_x \cdot d_x < 15R_x \qquad (5A)$$

In a case that a single element is used, or a plurality of colors are provided in a single cell, only one kind of liquid crystal is generally allowed. Accordingly, the product $A \cdot d$ should satisfy the following relation in an intermediate region of wavelength of light used:

$$4R < A \cdot d < 15R \qquad (5)$$

In a case that three colors R, G and B are provided in a single cell, the following relation should be satisfied because the intermediate region is a green color:

$$4R < A \cdot d_G < 15R \qquad (5B)$$

When the three colors R, G and B are used for a single cell, and the average particle diameter $R_G$ of the liquid crystal display element corresponding to a green light source has a value smaller than that as in the range of the equation (3), there is the wavelength dependency that the scattering property is stronger at the short wavelength side. Further, since a high electric field is needed in the operation of the liquid crystal, the problem of large consumption power arises. On the other hand, when the average particle diameter $R_G$ is larger than a value in the range as in the equation (3), the wavelength dependency of the scattering property becomes small. However, there arise problems that the scattering property becomes weak over the entire visible light region, the contrast ratio decreases, and the response in the transition time from a transparent state to a scattering state becomes slow. Accordingly, the above-mentioned range is most preferable. In this case, the gap $d_G$ between the electrode substrates of the liquid crystal display element corresponding to the green light source is also an important factor. When $d_G$ is made large, the scattering property when no electric field is applied is improved. However, when $d_G$ is too large, a high voltage is needed to obtain a sufficient transparent characteristic when an electric field is applied, whereby there cause problems that consumption power is increased, the conventional active element and driving IC for TN display element can not be used, etc.

Further, when $d_G$ is made small, the scattering property when no electric field is applied is decreased even though a high transparent characteristic can be obtained at a low voltage. Accordingly, $d_G$ ($\mu$m) should satisfy the above-mentioned equation (5B) in order that the scattering property when no electric field is applied is compatible with the high transparent characteristic when an electric field is applied.

In order to match the characteristics of the liquid crystal display element for each color, each of the liquid crystal display elements satisfies the following relations:

$$(\Delta n_i \cdot R_i)/(A_i \cdot \lambda_i) \approx (\Delta n_j \cdot R_j)/(A_j \cdot \lambda_j) \qquad (8)$$

and $$d_i/R_i \approx d_j/R_j \qquad (9)$$

or, it satisfies the following relation:

$$\Delta n_i \cdot d_i^2/\lambda_i \approx \Delta n_j \cdot d_j^2/\lambda_j \qquad (10)$$

where i and j represent different colors, and when three colors R, G and B are used, i and j represent different colors.

By matching the light phases under the conditions given by the above-mentioned equations (8) and (9), it is possible to substantially match the scattering intensity caused by the liquid crystal particles to each color, to substantially match the voltage-transmittance characteristics in an OFF state or a half tone display state, and to obtain a display having good chromatic balance.

In practice, a colored display having better chromatic balance can be obtained by a driving circuit for fine adjustment.

The characteristics for each color can also be uniform by letting the average particle diameter of the liquid crystal be constant for each color as shown in the equation (10) so that the value $\Delta n_x \cdot d_x^2/\lambda_x$ is matched. Accordingly, color correction can be carried out by using the equations (8) and (9), or the equation (10) in a paired liquid crystal display elements for which the characteristics have to be matched.

It is also possible that when three or more liquid crystal display elements are used for providing three or more colors, a part of the liquid crystal display elements satisfies the relation as in the equations (8) and (9), and the other part satisfies the relation as in the equation (10). Further, when three or more liquid crystal display elements are used for three or more colors and if there is a little difference of electro-optical characteristics to be corrected between certain colors, the color correction can be carried out only for the colors inducing a large difference of electro-optical characteristics by using the equations (8) and (9), or the equation (10). Specifically, when three kinds of color R, G and B are used, the ideal color correction can be attained if the color correction is carried out for all three liquid crystal display elements so as to satisfy the equations (8) and (9), or the equation (10). However, the color correction can be carried out for at least a pair of liquid crystal display elements among the three liquid crystal display elements by using the equations (8) and (9), or the equation (10). More specifically, of the following three sets of equations:

$$\Delta n_R \cdot R_R / A_R \cdot \lambda_R \approx \Delta n_G \cdot R_G / A_G \cdot \lambda_G \text{ and}$$
$$d_R / R_R \approx d_G / R_G$$

$$\Delta n_R \cdot R_R / A_R \cdot \lambda_R \approx \Delta n_B \cdot R_B / A_B \cdot \lambda_B \text{ and}$$
$$d_R / R_R \approx d_B / R_B$$

and $$\Delta n_G \cdot R_G / A_G \cdot \lambda_G \approx \Delta n_B \cdot R_B / A_B \cdot \lambda_B \text{ and}$$
$$d_G / R_G \approx d_B / R_B.$$

at least one set of equations can be satisfied. Or, of the following three equations:

$$\Delta n_R \cdot d_R^2 / \lambda_R \approx \Delta n_G \cdot d_G^2 / \lambda_G$$

$$\Delta n_R \cdot d_R^2 / \lambda_R \approx \Delta n_B \cdot d_B^2 / \lambda_B$$

and $$\Delta n_G \cdot d_G^2 / \lambda_G \approx \Delta n_B \cdot d_B^2 / \lambda_B$$

at least one set Of the equations can be satisfied.

When color correction is carried out for all three colors R, G and B, the equations (8), (9) and (10) are expressed as follows:

$$(\Delta n_R \cdot R_R)/(A_R \cdot \lambda_R) \approx (\Delta n_G \cdot R_G)/(A_G \cdot \lambda_G) \approx (\Delta n_B \cdot R_B)/(A_B \cdot \lambda_B) \qquad (8A)$$

and $$d_R/R_R \approx d_G/R_G \approx d_B/R_B \qquad (9A)$$

or $$\Delta n_R \cdot d_R^2/\lambda_R \approx \Delta n_G \cdot d_G^2/\lambda_G \approx \Delta n_B \cdot d_B^2/\lambda_B \qquad (10A)$$

Further, when the color correction is carried out for all three colors, it is possible to carry out the color correction for the colors R and G by using the equations (8) and (9) and for colors G and B by using the equation (10).

In particular, for the color corrections among R, G and B colors, since the optical color characteristics of red (R) color is generally very different from that of green (G) color or blue (B) color, the correction in color between R and G or between R and B is most important. Accordingly, it is possible that the color correction between R and G or R and B is made by using the equations (8) and (9) or the equation (10) while the liquid crystal display element for the G color is the same as the liquid crystal display element for the B color wherein the color correction between G and B is carried out by using the driving circuit (which requires more precise control of the voltage transmittance characteristics in a gray scale). In this case, it is unnecessary to prepare three kinds of liquid crystal display element as the liquid crystal display elements for the R, G and B colors, and it is enough to manufacture two kinds of liquid crystal display element. Accordingly, it is advantageous in manufacturing cost.

Although the contrast ratio under the condition of the equation (10) is more disadvantageous than that under the condition of the equations (8) and (9), the scattering property to each of the colors can be substantially uniform, and a display having good chromatic balance can be obtained. In this case, it is possible to unify the characteristics for each color by adjusting the gap between the electrode substrates if the same liquid crystal is used for each of the colors, the liquid crystal display element can be easily manufactured, and it is possible to obtain a multi-colored display having good chromatic balance with use of a single liquid crystal display element when it is combined with a color filter. When the same liquid crystal is used and a color filter is used, the equation (10) can be modified into $$d_i^2/\lambda_i \approx d_j^2/\lambda_j \, (i \neq j) \tag{10A}$$

When the color filter is used, the gap between the electrode substrates can be adjusted at each color filters for each color in accordance with the equation (10A), whereby a display having good chromatic balance can be obtained.

When three kinds of color R, G and B are used in the above-mentioned case, the equation (10A) can be expressed as follows:

$$d_R^2/\lambda_R \approx d_G^2/\lambda_G \approx d_B^2/\lambda_B \tag{10B}$$

In the above mentioned case too, it is possible that, for instance, correction is not carried out by adjusting the electrode gap between G and B, but correction is made only between R and G, and between R and B, while color correction between G and B is carried out by using the driving circuit. In this case, the equation (10A) is modified to be $d_R^2/\lambda_R \approx d_G^2/\lambda_G$ or $d_R^2/\lambda_R \approx d_B^2/\lambda_B$.

The particle diameter of the liquid crystal which renders the intensity of scattering at an OFF state to be the maximum is deeply concerned with $\lambda$ and $\Delta n$, and the intensity of scattering per unit quantity of operable liquid crystal is determined by $\Delta nR/\lambda$. Accordingly, when the characteristic of the liquid crystal for each color is made uniform by using the equations (8) and (9) and the same liquid crystal is used for each color, the average particle diameter of the liquid crystal should be greater when the liquid crystal is used at the side of longer wavelength. In consideration of the characteristic of the liquid crystal polymer composite material that the response time becomes longer as the average particle diameter becomes larger, it is desirable that the liquid crystal used at the side of longer wavelength has a greater value of $\Delta n$. The liquid crystal used may be selected taking account of the relation of the average particle diameter to the viscosity, the elastic constant and the specific dielectric anisotropy expressed in the equation (4), and a display of moving picture having uniform characteristics for each color is obtainable in response to the response characteristic, driving voltage and contrast ratio suitable for the liquid crystal used.

It is preferable that the refractive index anisotropy $\Delta n$ of the liquid crystal used is $\Delta n > 0.18$ as mentioned before. When a different liquid crystal is used for a different color, each of the liquid crystal used should satisfy the above-mentioned equations.

When the correction of the chromatic balance is conducted under the conditions of the equations (8) and (9) or the equation (10), the refractive index anisotropy for each color can be determined within the above-mentioned ranges. When $\lambda_i > \lambda_j$, it is preferable to satisfy the relation of $\Delta n_i \leq \Delta n_j$. Specifically, when three colors R, G and B are used as color light sources, it is preferable to be $\Delta n_B \leq \Delta n_G \leq \Delta n_R$.

The condition of $\Delta n_B \approx \Delta n_G \approx \Delta n_R$ means that the value $\Delta n$ is substantially uniform in the liquid crystal display element for each color, and this provides such an advantage that the same liquid crystal can be used for each of the liquid crystal display elements. In this case, the characteristics of the liquid crystal display elements can be corrected by adjusting the average particle diameter of the liquid crystal and the electrode gap in accordance with the equations (8) and (9), or by adjusting the electrode gap in accordance with the equation (10) or (10B).

Under the condition of $\Delta n_B < \Delta n_G < \Delta n_R$, the liquid crystal of the liquid crystal display element which is used in a long wavelength region has a larger value of $\Delta n$. Accordingly, it is unnecessary to considerably change the construction of the liquid crystal polymer composite material and the electrode gap for each color. In particular, when the value $\Delta n/\lambda$ substantially agrees with each other for each color, it is possible to obtain good chromatic balance by using the liquid crystal polymer composite materials which have the substantially same construction and the substantially same electrode gap for the liquid crystal display elements.

The condition of $\Delta n_B \approx \Delta n_G < \Delta n_R$ or $\Delta n_B < \Delta n_G \approx \Delta n_R$ means that the characteristics of three colors are substantially agreed with each other by using two kinds of liquid crystal. The characteristics of each color can be corrected by adjusting the average particle diameter of the liquid crystal and the electrode gap in accordance with the equations (8) and (9) or by adjusting the electrode gap in accordance with the equation (10).

The absolute value of the gap dx between the electrode substrates can be selected depending on the applied voltage used so that the brightness of the display and the contrast ratio become the optimum. It is preferable that the maximum applied voltage and the gap between the electrode substrates are in the range as follows:

$$0.8R \cdot V < A \cdot d < 1.8R \cdot V \text{ (where the same cells used for a color)} \tag{6}$$

or, $$0.8R_x \cdot V_x < A_x \cdot d_x < 1.8R_x \cdot V_x \text{ (where different cells are used for different colors)} \tag{6A}$$

In the above-mentioned range, it is possible to obtain a display having high contrast ratio even by using the conventional active element for TN and driving IC.

The value d or $d_x$ in the equation (6) or (6A) can be suitably determined in the relation between the specific dielectric anisotropy $\Delta\epsilon (=\epsilon// - \epsilon\perp)$ of the liquid crystal used and the elastic constant. Generally, the liquid crystal having a larger value $\Delta\epsilon (\Delta\epsilon > 5)$ should be used so that the value dx becomes maximum in the range that a sufficient transparent characteristic can be obtained by the maximum effective application voltage.

In the active matrix liquid crystal display element using the liquid crystal polymer composite material which provides a transparent state when a voltage is applied and a scattering state when no electric field is applied, the liquid crystal display element which satisfies the conditions of the equations (1) through (3), (8) and (9) can provide, by using the conventional active element for TN or conventional driving IC, a display having a high contrast ratio and brightness by the application of the voltage ranging in the equation (6).

In the case that cell conditions are changed to each color, the liquid crystal display element which satisfies the conditions of the equations (1A) through (5A) and (8) and (9), or the equations (1A) through (5A) and (10) can provide, by using the conventional active element for TN and driving IC, a projection display of colored moving picture having high contrast ratio, brightness and good chromatic balance in a range of voltage expressed in the equation (6A). Specifically, it is possible to obtain a display wherein the contrast ratio is 100 or higher, the transmittance when an electric field is applied is 70% or higher and the response time at the time of gray scale display is 100 msec or lower.

When the liquid crystal display element is used for a reflection type display apparatus, the scattering property in scattering state increases since light passes twice through the liquid crystal polymer composite material. Accordingly, it is possible to reduce the value dx within the range as in the equation (5) or (5A), and the maximum driving voltage determined in accordance with the equation (6) or (6A) can be also reduced.

In order to improve the scattering property when no electric field is produced, it is effective to increase the volume fraction $\Phi$ of the liquid crystal which is operable in the liquid crystal polymer composite material. The range of $\Phi > 20\%$ is preferred. In order to obtain higher scattering property, it is preferable to be $\Phi > 35\%$, more preferably $\Phi > 45\%$. On the other hand, when the value $\Phi$ is excessively high, the stability in structure of the liquid crystal polymer composite material becomes inferior. Accordingly, it is preferable that $\Phi < 70\%$.

In order that the liquid crystal particles in the liquid crystal display element of the present invention have a specified aspect ratio, a pressure may be applied to the liquid crystal polymer composite material from outside during or after the manufacture of the composite material. Alternatively, the shape of the liquid crystal particles may be changed by controlling the surface energy and the elastic constant of the polymer matrix, the inner stress due to the shrinkage of the polymer matrix induced by curing, and so on. Specifically, the composition of the curable compound, the temperature of curing, the speed of curing of the polymer matrix may be experimentally controlled so as to obtain desired average particle diameter, the distribution of the diameter and the aspect ratio.

In the present invention, it is necessary that the direction of the long axis of the liquid crystal particles is substantially random in the two-dimensional space in a plane cut in the vertical direction to the electrode surfaces on the liquid crystal polymer composite material as described above. In this respect, it is not desirable to use a method of elongation in only one axial direction because the direction of the long axis aligns in one direction.

The liquid crystal display element of the present invention shows, when no electric field is applied, a scattering state (i.e., an opaque state) due to a difference in refractive index between the liquid crystal not in an oriented condition and the polymer matrix. Accordingly, when the liquid crystal is used for a projection type display apparatus as in the present invention, light is scattered at a portion of the liquid crystal display element at which no electrode is located, and the portion looks dark because light does not reach a projection screen even when no light shielding layer is provided at the portion other than picture elements. In order to prevent light from leaking from any other portion of the liquid crystal display element than the picture element electrodes, it is unnecessary to provide a light shielding layer for the portion other than the picture element electrodes. Accordingly, there is an advantage that the step of forming the light shielding layer is unnecessary.

An electric field is applied to a desired picture element. At the picture element portion to which the electric field is applied, the liquid crystal is oriented so that the ordinary refractive index ($n_0$) of the liquid crystal and the refractive index ($n_p$) of the polymer matrix coincide with each other. Accordingly, the liquid crystal display element presents a transparent state, and light is transmitted through desired picture elements to thereby provide a bright display on a projection screen.

If the polymer is cured during the curing step while a sufficiently high voltage is applied only to a specified portion of the element, the portion is formed to have a normally light transparent state. Accordingly, in a case that formation of a fixedly display portion is desired, such a normally transparent portion may be formed.

In the active matrix liquid crystal display element of the present invention, a colored display can be attained by providing a color filter. Color filters having different three colors may be provided in a single liquid crystal display element, or a color filter for a specified color may be provided in a single liquid crystal display element and three liquid crystal display elements having different color filters may be used in combination. The color filter may be provided on the surface having electrodes of the substrate or may be provided at the outside of the substrate.

Further, dye, pigment or the like may be mixed into the liquid crystal polymer composite material to conduct a color display.

Preferred embodiments of the active matrix liquid crystal display element and the projection type active matrix liquid crystal display apparatus of the present invention will be described with reference to the drawings.

Figure 1:
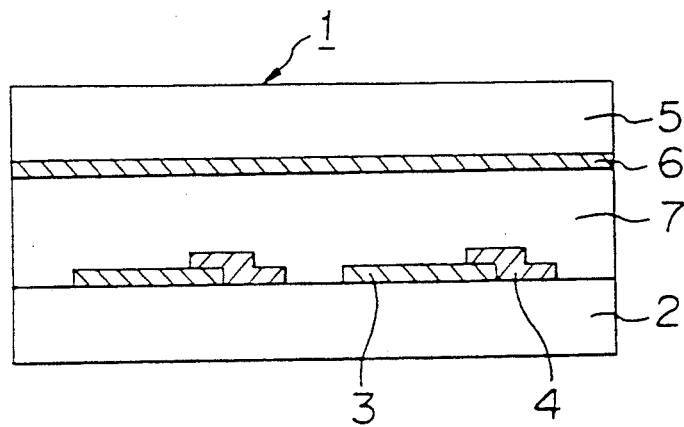
FIG. 1 is a diagram showing the basic construction of an embodiment of an active matrix liquid crystal display element of the present invention.

FIG. 1 is a cross-sectional view showing an embodiment of the active matrix liquid crystal display element of the present invention.

In FIG. 1, reference numeral 1 designates a liquid crystal display element, numeral 2 designates a substrate such as glass, plastics or the like which is used for an active matrix substrate, numeral 3 designates a picture element electrode such as ITO ($In_2O_3-SnO_2$), $SnO_2$ or the like, numeral 4 designates an active element such as a transistor, a diode, a non-linear resistance element or the like, numeral 5 designates a substrate such as glass, plastics or the like which is used for a counter electrode substrate, numeral 6 designates a counter electrode such as ITO, $SnO_2$ or the like, and numeral 7 designates a liquid crystal polymer composite material interposed between the substrates.

Figure 2:
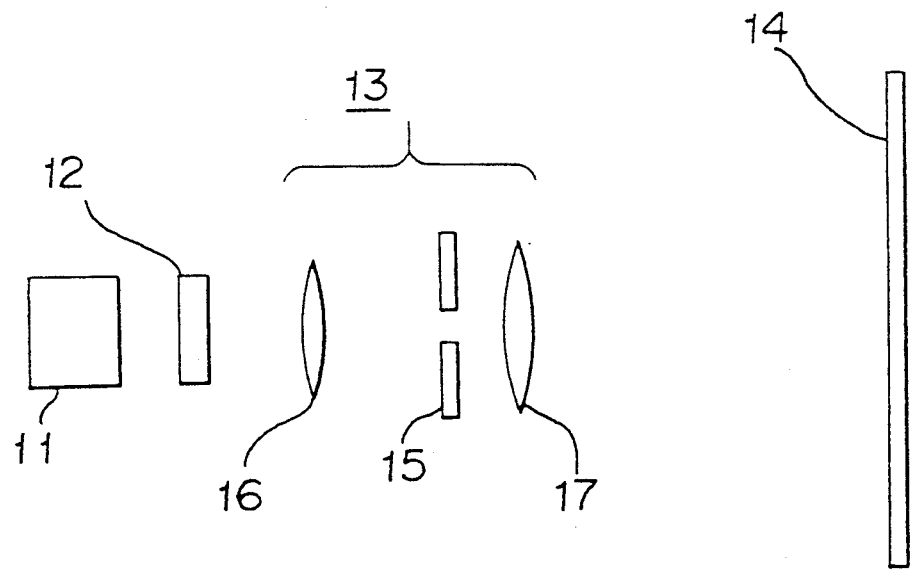
FIG. 2 is a diagram showing the basic construction of an embodiment of a projection type active matrix liquid crystal display apparatus in which the liquid crystal display element according to the present invention is used.

FIG. 2 is a diagram showing an embodiment of the projection type active matrix liquid crystal display apparatus in which the active matrix liquid display element of the present invention is used.

In FIG. 2, reference numeral 11 designates a projection light source, numeral 12 designates a liquid crystal display element, numeral 13 designates a projection optical system including elements such as a lens, an aperture and so on, and numeral 14 designates a projection screen. In this embodiment, the projection optical system includes an aperture means or spot 15 constituted by a perforated plate, a focusing lens 16 and a projection lens 17.

Figure 3:
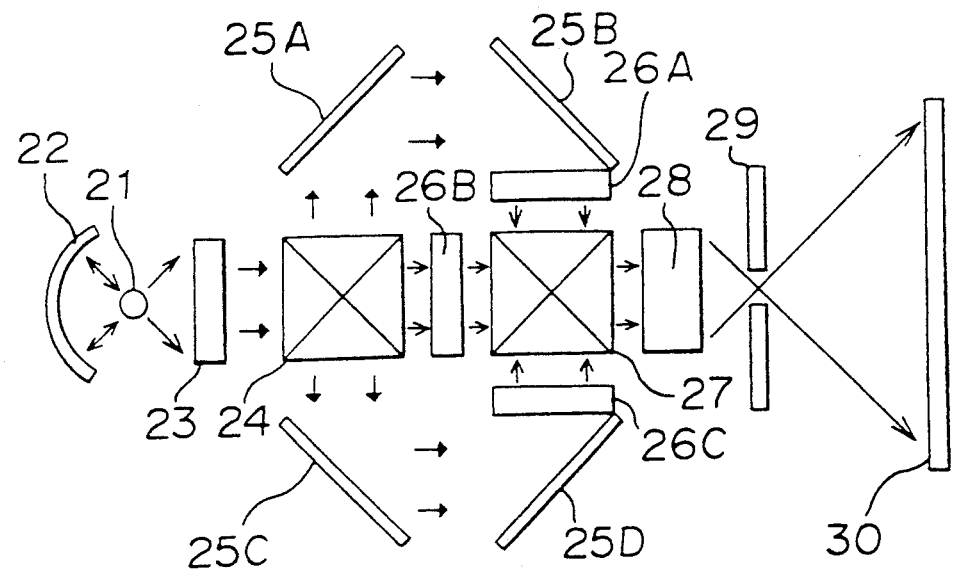
FIGS. 3 and 4 are respectively diagrams showing the basic construction of embodiments of full-color projection type active matrix liquid crystal display apparatus in which three liquid crystal display elements according to the present invention are used.

FIG. 3 is a diagram showing an embodiment of the full-color projection type active matrix liquid crystal display apparatus in which dichroic prisms are used, in accordance with the present invention.

In FIG. 3, reference numeral 21 designates a light source, numeral 22 designates a concave mirror, numeral 23 designates a condenser lens, numeral 24 designates a color splitting dichroic prism, numerals 25A, 25B, 25C, 25D designate mirrors, the elements 21 through 25D constituting a color light source, numerals 26A, 26B, 26C designate active matrix liquid crystal elements each having a liquid crystal polymer composite material corresponding to each color, numeral 27 designates a synthesizing dichroic prism, numeral 28 designates a projection lens, numeral 29 designates an aperture for removing light other than straight-forward light and numeral 30 designates a projection screen, the elements 27 through 29 constituting a projection optical system.

Figure 4:
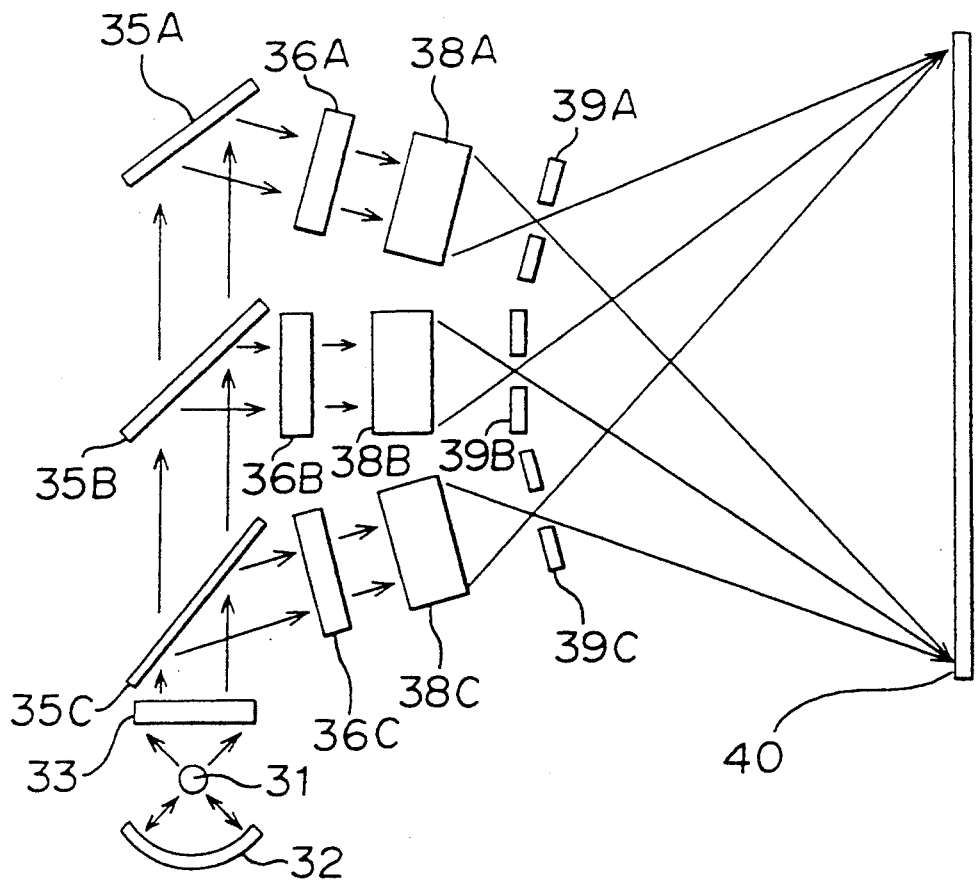
Figure 5:
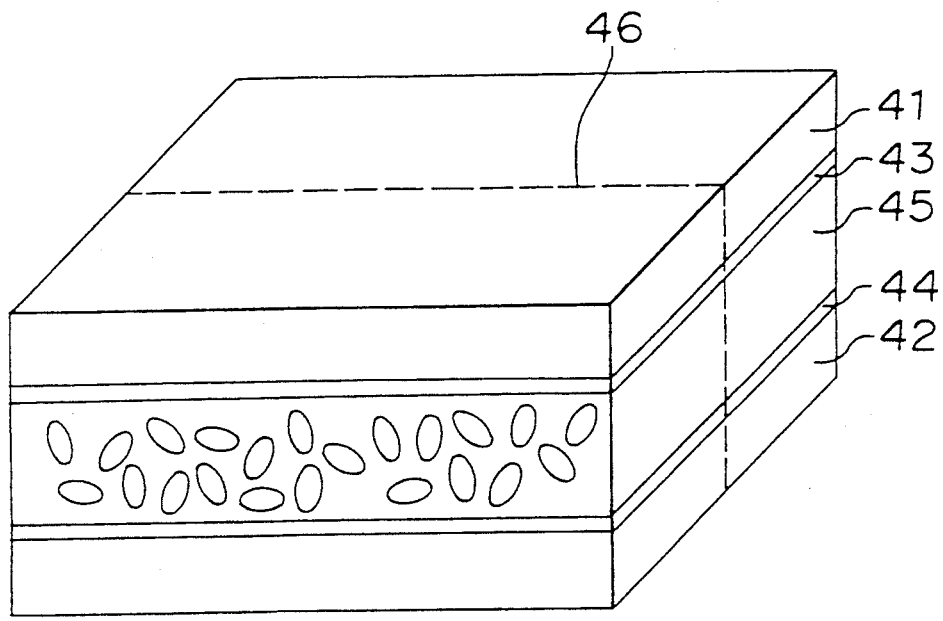
FIG. 5 is a perspective view which illustrates the direction of the long axis of each liquid crystal particle in a liquid crystal polymer composite material.
Figure 6:
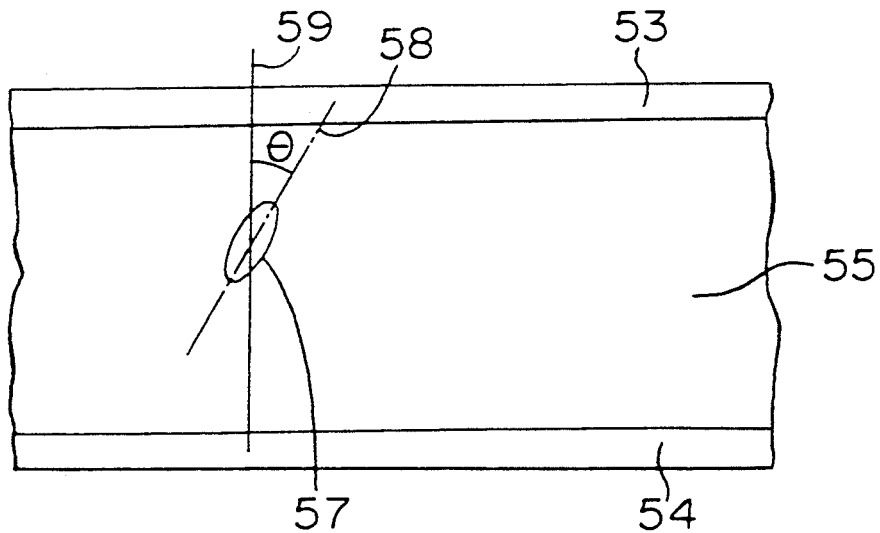
FIG. 6 is a cross-sectional view of the material as in FIG. 5.

FIG. 4 is a diagram showing an embodiment of the full-color projection type active matrix liquid crystal display apparatus of the present invention wherein no dichroic prism is used.

In FIG. 4, reference numeral 31 designates a light source, numeral 32 designates a concave mirror, numeral 33 designates a condenser lens, numerals 35A, 35B, 35C designate dichroic mirrors, the elements 31 through 35C constituting a color light source, numerals 36A, 36B, 36C designate active matrix liquid crystal display elements each having a liquid crystal polymer composite material corresponding to each color, numerals 38A, 38B, 38C designate projection lenses provided for each color, numerals 39A, 39B, 39C designate apertures for removing light other than straight-forward light which are respectively provided for different colors, and numeral 40 designates a projection screen, the elements 38A–39C constituting a projection optical system.

In a case of using a three-terminal element such as TFT (thin film transistor) as the active element in accordance with the present invention, a solid electrode in common with all picture elements may be disposed for the counter electrode substrate. In the case of using a two-terminal element such as an MIM element or a PIN diode, however, the counter electrode substrate is applied with a stripe-like patterning.

In the case of using TFT as the active element, silicon is suitable as the semiconductor material. Polycrystalline silicon is particularly preferred since it has less photosensitivity as in amorphous silicon and, accordingly, does not cause erroneous operation even without shielding light from a light source by means of a light shielding film. In the case of using polycrystalline silicon for the projection type liquid crystal display apparatus in the present invention, a strong light source for projection can be utilized and a bright display is obtainable.

In the case of the conventional TN type liquid crystal display element, a light shielding film is often formed between picture elements so as to suppress the leakage of light from the portion between the picture elements, and a light shielding film can be formed to the active element at the same time of forming the light shielding film between the picture elements. Accordingly, formation of the light shielding film to the active element gives no substantial effect on the entire steps. Namely, if the polycrystalline silicon is used for the active element and the light shielding film is not formed to the active element portion, the number of steps can not be decreased if it is required to form the light shielding film at the portion between the picture elements.

On the contrary, in the present invention, since the liquid crystal polymer composite material wherein the refractive index of the polymer matrix substantially agrees with the ordinary refractive index ($n_0$) of the liquid crystal used, is used as described before, light is scattered at the area not applied with the electric field, and it appears dark on the projection screen. Accordingly, there is no requirement for forming the light shielding film in the portion between the picture elements. Therefore, in the case of using the polycrystalline silicon as the active element, there is no requirement for forming the light shielding film at the active element portion, and accordingly, the step of forming the light shielding film can be eliminated or severe requirements to the light shielding film can be reduced, whereby the number of manufacturing steps can be reduced and the productivity is improved.

Even in the case of using the amorphous silicon, if the light shielding film is formed at the semiconductor portion, the active matrix liquid crystal display element of the present invention can be used.

Further, the electrodes used are usually transparent electrodes. In the case of using the electrodes for a reflection type liquid crystal display apparatus, however, a reflection electrode made of a material such as Cr, Al or the like may be used.

In the liquid crystal display element and the liquid crystal display apparatus according to the present invention, an infrared ray cut filter or UV-ray cut filter or the like may be used in a lamination form, or characters, figures or the like may be printed, or a plurality of liquid crystal display element may be used.

Further, in the present invention, a protective plate such s glass plate, a plastic plate or the like may be overlaid on or at the outside of the liquid crystal display element. The protective plate reduces a danger of the breakage of the display element when the surface of the element is pushed, whereby the safety of the display element is improved.

In the case of using a photo-curable compound constituting the liquid crystal polymer composite material as described above in the present invention, photo-curable vinyl compound is preferably used.

Specifically, there can be exemplified a photo-curable acryl compound and, particularly, those containing acryl oligomer which is curable upon polymerization under the irradiation of light are particularly preferred.

The liquid crystal used in the present invention may be a nematic liquid crystal having a positive dielectric anisotropy and such a liquid crystal that the refractive index of the polymer matrix agrees with the ordinary refractive index ($n_0$) of the liquid crystal. Such liquid crystal may be used solely or may be used as a composition, and the use of a composition can be advantageous for satisfying various demands such as working temperature range, working voltage, etc.

When the photo-curable compound is used for the liquid crystal polymer composite material, it is preferable to uniformly dissolve the photo-curable compound in the liquid crystal. The cured material after exposure to light can not be dissolved or is hardly dissolved. When the above-mentioned composition is used, it is desirable to use the liquid crystal having a closer value in solubility.

The liquid crystal polymer composite material is prepared as follows. For instance, an active matrix substrate and a counter electrode substrate are arranged, and the surfaces with electrodes of the substrates are opposed; the circumferential portions of the two substrates opposed are sealed with a sealing material; a mixed solution of uncured liquid crystal polymer composite material is injected through an injection port followed by sealing the injection port. Or a mixture of uncured compound and liquid crystal is supplied to one of the substrates, followed by overlaying the other so as to oppose to each other, in the same manner as the conventional preparation of the liquid crystal display element.

For the liquid crystal display element of the present invention, di-chroic dye, dye or pigment may be added to the liquid crystal, or a colored material may be used as a curable compound.

In the present invention, when the liquid crystal in the liquid crystal polymer composite material is utilized as the solvent, and the photo-curable compound is cured by the exposure to light, it is unnecessary to evaporate solvent or water which is needless at the curing time. Accordingly, in this case, the conventional method of preparation of the injection of liquid crystal to the cell can be employed because the curable compound is cured in an enclosed system. The curing of the curable compound in the enclosed system provides high reliability. This can be further assured by the effect obtained by bonding the two substrates with the photo-curable compound.

In the present invention, since the liquid crystal polymer composite material is used, a possibility that the upper and lower transparent electrodes may short-circuit can be reduced, and it is unnecessary to strictly control the orientation of the liquid crystal and the substrate gap as required for the conventional TN type display element. Accordingly, the liquid crystal display element capable of controlling a transparent state and a scattering state can be effectively produced.

In the liquid crystal display element of the present invention, it is preferable to laminate a protective plate such as plastics or glass at the outside of the substrate in a case that the substrate is made of plastics or a thin glass plate.

The liquid crystal display apparatus of the present invention can be driven with the maximum effective voltage or lower as in the before-mentioned equation (6) or (6A). Generally, the liquid crystal display apparatus is driven so that the maximum effective voltage is applied to the liquid crystal polymer composite material between picture element electrodes and a counter electrode.

A conventional light source or color light source, the projection optical system, the projection screen can be used in the present invention as the light source, the projection optical system, the projection screen to receive projected light. It is enough that the active matrix liquid crystal display element is disposed between the color light source and the projection optical system. In this case, the projection optical system may be used in such a manner that images from the plurality of the active matrix liquid crystal display elements are synthesized with use of an optical system and the synthesized image is projected, as shown in FIG. 3. Alternatively, as shown in FIG. 4, the images of the plurality of the active matrix liquid crystal elements are respectively projected on the projection screen so that the images are synthesized on the projection screen.

In the above-mentioned embodiments, the color light source is obtained by subjecting light from a single light source to color splitting. However, a plurality of light sources having different colors may be separately provided so that lights of the plurality of the light sources are caused to enter into the active matrix liquid crystal display elements.

As the light source used for the light source or the color light source, there are a halogen lamp, a metal halide lamp, a xenone lamp and so on. Further, a concave mirror, a condenser lens or the like may be combined with the lamp to increase utilization of light.

In addition to the lamp or the combination of the lamp and the mirror or lens, a cooling system may be added, or an infrared ray cut filter or an UV ray cut filter may be added, or a TV channel display devise such as LED or the like may be added.

In particular, in the case of using the projection type display, a devise for reducing diffusion light, e.g. an aperture or a spot as indicated by numerals 15, 29, 39A, 39B, 39C in FIG. 2 through 4 may be disposed on the optical path so that the contrast ratio of display can be increased. Namely, the device for reducing diffusion light is preferred to use such a device that among incident light passing though the liquid crystal display element, straight-forward light (light which has transmitted portions in which the picture element portions are in a transparent state) is taken, and non-straight-forward light (light scattered at portions in which the liquid crystal polymer composite material is in a scattering state) is diminished. Such diffusion light reducing device is preferred because the contrast ratio can be improved. In particular, the device which does not reduce the straight-forward light but reduces diffusion light on the non-straight-forward light, is preferred.

The device for reducing the diffusion light may be provided between the projection optical system and the projection screen as shown in FIGS. 3 and 4. Further, the device for reducing diffusion light may be disposed between lenses in a case that the projection optical system is constituted by a plurality of lenses.

The device for reducing diffusion light is not limited to the above-mentioned aperture or spot, but may be a mirror having a small surface area disposed on the optical path, for instance.

The focal length or the diameter of a projecting lens may be suitably selected so as to remove scattering light, without using a specially arranged aperture.

Further, a microlens system can be used. Specifically, a combination of a microlens array and a spot array in which fine holes are formed in array may be disposed at the side of the projection optical system with respect to the liquid crystal display element to thereby remove needless scattering light. This arrangement has an advantage of reducing the entire size of the projection type display apparatus because the optical path length necessary for removing scattering light can be remarkably shortened. In order to reduce the optical path length, the installation of the scattering light removing system in the projection optical system is effective way. The structure of projection type display apparatus in which the scattering light removing system is installed in the projection optical system is simpler than the structure in which the projection optical system and the scattering light removing system are independently disposed, whereby the entire size of the apparatus can be reduced.

These systems may be used in combination with a mirror, a dichroic mirror, a prism, a dichroic prism, a lens and so on to synthesize a picture image and to display a colored image. Further, a colored picture image is obtainable by combining the optical system with a color filter.

The ratio of the scattered light component and the straight-forward light component reaching on the projection screen can be controlled by adjusting the diameter of the spot or the mirror and the focal length of the lens, so that a desired contrast ratio of display and the brightness in display can be obtained.

When the device for reducing diffusion light such as an aperture is used, light entering from the projection light source to the liquid crystal display element should be parallel in order to increase the brightness of display. For this, it is preferable to constitute a projection light source by combining a light source capable of providing high brightness (which should be a point light source), a concave mirror, a condenser lens and so on.

Description has been made mainly as to the projection type display apparatus having a transparent type structure. However, the present invention is applicable to a projection type display apparatus having a reflection type structure wherein a small mirror is disposed, instead of a spot, to take out only necessary light.

In accordance with the present invention, a display having a high contrast ratio is obtainable. In particular, when the present invention is applied to a projection type display, the transparent-scattering type liquid crystal display element permits light to pass through portions which are in a transparent state whereby a bright display is provided on the projection screen, whereas it causes scattering of light at portions which are in a scattering state whereby a dark display is provided on the projection screen. Thus, a display of high brightness and a high contrast ratio is obtainable.

In the present invention having the above-mentioned construction, the maximum effective voltage V applied to the liquid crystal polymer composite material can be 10 V or lower and fast response characteristic is obtainable even in a half tone display. Further, hysteresis and image-sticking can be reduced. Accordingly, a display of moving picture can be easily attained by using an active element and driving IC which has been used for the conventional TN active matrix liquid crystal display element. Further, in accordance with the present invention, a gray scale display having good chromatic balance and beautiful colors is possible without installing a special correction circuit for the driving circuit.

In the following, the present invention will be described more in detail in connection with various examples.

EXAMPLE 1

Chrome was vapor-deposited to a thickness of 60 nm on a glass substrate ("7059" substrate manufactured by Corning), and the article was patterned to form gate electrodes. Then, a silicon oxynitride film and an amorphous silicon film were deposited by using a plasma CVD apparatus. Then, after annealing with use of a laser, a patterning operation was conducted to form polysilicon. Phospher-doped amorphous silicon and chrome were deposited on the polysilicon using the plasma CVD and a vapor-deposition apparatus. A patterning operation was conducted to cover the polysilicon to form source electrodes and drain electrodes for the first layer. Further, vapor-deposition of ITO was conducted. Then, the article was patterned to form picture element electrodes. Then, chrome and aluminum were successively vapor-deposited. A patterning operation was conducted to form the second layer of the source electrodes, and the second layer of the drain electrodes was connected to the picture element electrodes and the first layer of drain electrodes. Then, a silicon oxynitride film was deposited to form a protective layer by using the plasma CVD apparatus to thereby form an active matrix substrate.

A counter electrode substrate was prepared by using the same glass substrate as used for the active matrix substrate, on the entire surface on which an ITO electrode is formed. The counter electrode substrate and the previously prepared active matrix substrate were disposed so as to face the electrode surfaces of the both substrates. Spacers each having diameter of about 11.0 $\mu$m were placed in the space between the substrates. The peripheral portions of the substrates were sealed with a sealing material of an epoxy series resin except the location of an injection port to produce an empty cell having a gap d of 11.0 $\mu$m.

A nematic liquid crystal having about 0.24 of $\Delta n$, about 16 of $\Delta \epsilon$, about 15 ($\times 10^{-12}$N) of K33 and about 37 cSt of viscosity, acrylate monomer, bifunctional urethane acrylate oligomer and a photo-cure initiator were uniformly dissolved to prepare solution. The solution was injected in the cell, and the cell was exposed to UV rays to cure the liquid crystal polymer composite material to thereby complete an active matrix liquid crystal display element. The liquid crystal quantity, the gap between the electrodes, the average particle diameter R of the liquid crystal, and the average aspect ratio A of liquid crystal particle were respectively 68 wt %, about 11 $\mu$m, about 1.9 $\mu$m and 1.5.

When the liquid crystal display element was driven with a video signal so that the voltage applied to the liquid crystal polymer composite material was 8 V in terms of effective value (root mean value), it was found that a moving picture in a half tone (gray scale) could be obtained without residual image, and there was little image-sticking when the picture was changed. The liquid crystal display element was combined with a projection light source and a projection optical system to form a projection type liquid crystal display apparatus. In the projection type liquid crystal display apparatus, a collection cone angle δ (which is determined in the relation of the diameter of the spot to the distance between the lens and the spot) was adjusted to 6°. As a result, a display of moving picture was obtained without any residual image even in a half tone display. The contrast ratio on the screen was about 110.

EXAMPLE 2 AND COMPARATIVE EXAMPLES 1 AND 2

Active matrix liquid crystal display elements each having liquid crystal polymer composite material were prepared in the substantially same as Example 1 except that the composition of acrylate monomer, the proportion of liquid crystal, the polymerization temperature, the intensity of irradiating UV rays and the average liquid crystal particle diameter R and the aspect ratio A of the liquid crystal particle were changed. In Example 2 and Comparative Examples 1 and 2, the values R/A were made substantially equal to those of Example 1 in order to unify the driving voltage and the electrode gap. Thus, of the conditions in the equations (1)–(5), only the condition of the aspect ratio was different from that of Comparative Examples.

Of these active matrix liquid crystal display elements, the average particle diameter R (μm), the aspect ratio A, the contrast ratio CR on a projection screen under the maximum driving voltage of 8 V and the response $\tau$ (msec) under the condition of 0 V→saturated transmittance×0.2 (about 16%) were respectively measured.

The result of measurement is shown in Table 1.

TABLE 1

| Example No. | R μm | A | CR | $\tau$ msec |
|---|---|---|---|---|
| Example 2 | 2.2 | 1.7 | 80 | 100 |
| Comparative Example 1 | 1.6 | 1.2 | 130 | 120 |
| Comparative Example 2 | 1.8 | 2.7 | 40 | 70 |

When the active matrix liquid crystal display element of Example 2 was driven with a video signal, a display of moving picture without residual image was obtained even in a half tone display, and little image-sticking was found even at the time of changing the picture.

When the active matrix liquid crystal display element of Comparative Example 1 was driven with a video signal, a display of moving picture without residual image was obtained even in a half tone display, but there was found a slight image-sticking of the previous picture (a residual image for more than a second) at the time of changing the picture.

Although the contrast ratio of Examples 1 and 2 was different from that of Comparative Example 1, there was little difference in view.

In the active matrix liquid crystal display element of Comparative Example 2, the contrast ratio of 40 could not be obtained until the driving voltage was increased to 15 V.

EXAMPLE 3

An active matrix liquid crystal display element was prepared by injecting into a cell solution obtained by dissolving uniformly acrylate monomer, urethane acrylate oligomer and a photo-cure initiator in a nematic liquid crystal having about 0.29 or Δn, about 16 of Δε, about 15 ($\times 10^{-12}$N) of K33 and about 52 cSt of viscosity, and by curing the liquid crystal polymer composite material by subjecting it to exposure to UV rays. The liquid crystal quantity was 68 wt %, the electrode gap was about 9.5 μm, the average particle diameter of the liquid crystal was about 1.8 μm and the aspect ratio was about 1.7.

When the liquid crystal display element was driven with a video signal having the maximum driving voltage of 8 V in terms of effective value, a display of moving picture was obtained without residual image even in a half tone display and little image-sticking was found even at the time of changing the picture. The response time (a 90% transmittance change) was 10 msec under the condition of 8 V→0 V, 12 msec under 0 V→8 V and 100 msec under 0 V→saturated transmittance×0.2 (about 16%) respectively.

The liquid crystal display element was combined with a projection light source and a projection optical system to thereby form a projection type liquid crystal display apparatus. Projection of light on a screen provided a display of fine moving picture without residual image in a half tone. The contrast ratio on the screen was about 100.

EXAMPLE 4

An active matrix liquid crystal display element was prepared by injecting in an empty cell according to Example 1 solution obtained by uniformly dissolving acrylate monomer bifunctional urethane acrylate oligomer and a photo-cure initiator in a nematic liquid crystal having about 0.24 of Δn, about 16 of Δε, about 18 ($\times 10^{-12}$N) of K33 and about 54 cSt of viscosity, and by curing the liquid crystal polymer composite material by subjecting it to exposure to UV rays.

The liquid crystal quantity was 64 wt %, the electrode gap d was about 11 μm, the average particle diameter R of the liquid crystal was about 2.0 μm and the aspect ratio A in average was 1.7. Only the condition of the equation (4) is different from the conditions of the equations (1)–(5).

When the element was driven with a video signal so that a voltage applied to the liquid crystal polymer composite material was 8 V in terms of effective value, a display of moving picture in a half tone state was obtained while there was a little residual image for less than a second and little image-sticking was found at the time of changing the picture.

The response time (a 90% transmittance change) was 20 msec under 8 V→0 V, 30 msec under 0 V→8 V and 400 msec under 0 V→saturated transmittance×0.2 (about 16%).

EXAMPLE 5

An active matrix liquid crystal display element was prepared by injecting in an empty cell of Example 1 solution obtained by uniformly dissolving acrylate monomer, bifunctional urethane acrylate oligomer and a photo-cure initiator in a nematic liquid crystal having about 0.24 of Δn, about 16 of Δε, about 15 ($\times 10^{-12}$N) of K33 and about 37 cSt of viscosity, and by curing the liquid crystal polymer composite material by subjecting it to exposure to UV rays. The liquid crystal quantity was 68 weight %, the electrode gap $d_G$ was about 11 μm, the average particle diameter $R_G$ of the liquid crystal was about 1.6 μm and the aspect ratio $A_G$ in average was 1.5.

In the same manner as above, a cell having $d_R = 13.5$ μm, $R_R = 1.9$ μm and $A_R = 1.5$ for a color of red and a cell having $d_B = 9.5$ μm, $R_B = 1.5$ μm and $A_B = 1.5$ for a color of blue were respectively prepared. These three elements were combined with a projection light source and a projection optical system to thereby form a projection type liquid crystal display apparatus as shown in FIG. 3. When the projection type liquid crystal display apparatus was driven with a video signal having the maximum driving voltage of 7 V in terms of effective value to project a picture image on a screen, a display of moving picture having good chromatic balance and without a residual image was obtained even in a half tone display. The contrast ratio on the screen was about 120 and little image-sticking was found at the time of changing the picture.

The response time (90% transmittance change wherein R, G and B were simultaneously driven and measured under mono-chrom) was 10 msec under 7 V→0 V, 15 msec under 0 V→7 V and 80 msec under 0 V→saturated transmittance ×0.2 (about 16%).

EXAMPLE 6

Three liquid crystal display elements for green color in Example 5 were prepared in the same manner as described in Example 5. These liquid crystal display elements were combined with a light source having three colors R, G and B to constitute the same projection type display apparatus as in Example 5.

The projection type display apparatus provided a display without residual image and having little image-sticking. However, the display obtained had generally reddish picture and in particular, this tendency was remarkable in a half tone display. When the three liquid crystal display elements were rendered to be in a state without applying any electric field, the projection screen did not become dark but it exhibited a dark red color. It was likely because of different threshold voltage characteristics of the liquid crystal polymer composite material for R, G and B. In examination of applied voltage-transmittance characteristics for each of R, G and B, it was found that R exhibited the highest transmittance and B exhibited the lowest transmittance in a half tone region under the application of the same voltage.

EXAMPLE 7

Three liquid crystal display elements for red color in Example 5 were prepared in the same manner as described in Example 5. And these display elements were combined with a light source having three colors R, G and B to form the same projection type display apparatus as in Example 5.

The projection type display apparatus provided a display without residual image and having little image-sticking. The display obtained was of generally reddish picture image, and in particular, this tendency was remarkable in a half tone display. However, when color correction was made for each color by means of a driving circuit, a colored display having good color balance was obtained. The contrast ratio on the screen of the projected image was about 120.

COMPARATIVE EXAMPLE 3

A projection type active matrix liquid crystal display element was prepared in the same manner as described in Example 5 except that an ordinary nematic liquid crystal was used instead of the liquid crystal polymer composite material (whereby a TN type liquid crystal display element was prepared).

The liquid crystal display element was used in combination with the projection light source and the projection optical system as in Example 5 to thereby form a projection type liquid crystal display apparatus. The projection type liquid crystal display apparatus was driven in the same manner as described in Example 5. The brightness of display on the projection screen was about ⅓ as dark as the case in Example 5 and the contrast ratio was about 100.

The response time was 25 msec under 5 V→0 V, 30 msec under 0 V→5 V and 160 msec under 0 V→saturated transmittance ×0.2 (about 6%).

EXAMPLE 8 AND COMPARATIVE EXAMPLES 4 AND 5

Active matrix liquid crystal display elements were prepared in the same manner as in Example 5 wherein the average particle diameter R of the liquid crystal and the substrate gap d were changed.

For each of the active matrix liquid crystal display elements, the transmittance $T_{8V}$ when a voltage of 8 V was applied, the contrast ratio CR on the screen when the projection of picture image was made with use of the projection optical system and the response time $\tau$ under the condition of 0 V→saturated transmittance×0.2 (about 16%) were respectively measured.

The average particle diameter Rx of the liquid crystal and the substrate gap dx of the liquid crystal display elements for respective colors were determined as follows.

EXAMPLE 8 red: $R_R = 1.8$ μm, $d_R = 10.5$ μm, $A_R = 1.8$
green: $R_G = 1.8$ μm, $d_G = 9.5$ μm, $A_G = 1.6$
blue: $R_B = 1.8$ μm, $d_B = 9.0$ μm, $A_B = 1.5$

COMPARATIVE EXAMPLE 4 red: $R_R = 3.0$ μm, $d_R = 12.5$ μm, $A_R = 1.4$
green: $R_G = 2.6$ μm, $d_G = 11.0$ μm, $A_G = 1.4$
blue: $R_B = 2.3$ 82 m, $d_B = 10.0$ μm, $A_B = 1.4$

COMPARATIVE EXAMPLE 5 red: $R_R = 2.1$ μm, $d_R = 11.5$ μm, $A_R = 1.2$
green: $R_G = 1.8$ μm, $d_G = 10.0$ μm, $A_G = 1.2$
blue: $R_B = 1.6$ μm, $d_B = 9.0$ μm, $A_B = 1.2$ The result of measurement is shown in Table 2. Example 8 and Comparative Examples 4 and 5 respectively exhibited excellent chromatic balance.

TABLE 2

| Example No. | $T_{8V}$ % | CR | $\tau$ msec | Image-sticking | Chromatic balance |
|---|---|---|---|---|---|
| Example 8 | 70 | 100 | 100 | ○ | ○ |
| Comparative Example 4 | 75 | 80 | 450 | ○ | ○ |
| Comparative Example 5 | 75 | 150 | 500 | x | x |

EXAMPLE 9

A projection type active matrix liquid crystal display apparatus was prepared in the same manner as described in Example 5 wherein liquid crystal used for the liquid crystal display elements for respective colors, the average particle diameter and the electrode substrate gap were determined as follows.

Liquid crystal for R: $\Delta n$=about 0.29, $\Delta \epsilon$=about 16, K33=about 16 ($\times 10^{-12}$N), viscosity $\eta$=about 52 cSt, $R_R$=about 1.6 $\mu$m, $d_R$=10.0 $\mu$m, $A_R$=about 1.5

Liquid crystal for G: $\Delta n$=about 0.24, $\Delta \epsilon$=about 16, K33 =about 15 ($\times 10^{-12}$N), viscosity $\eta$=about 37 cSt, $R_G$=about 1.6 $\mu$m, $d_G$=10.0 $\mu$m, $A_G$=about 1.4

Liquid crystal for B: $\Delta n$=about 0.22, $\Delta \epsilon$=about 15, K33=about 15 ($\times 10^{-12}$N), viscosity $\eta$=about 34 cSt, $R_B$=about 1.6 $\mu$m, $d_B$=10.0 $\mu$m, $A_B$=about 1.4

These display elements were combined with the projection light source and the projection optical system to thereby form a projection type liquid crystal display apparatus as shown in FIG. 3. When the projection type liquid crystal display apparatus was driven with a video signal having a maximum driving voltage of 7 V in terms of effective value so that a picture image was projected on a screen, a display of moving picture having good chromatic balance and little image-sticking was obtained even in a half tone display. The contrast ratio on the screen was about 140.

The response time was 20 msec under 7 V→0 V, 20 msec under 0 V→7 V and 100 msec under 0 V→saturated transmittance×0.2 (about 16%).

EXAMPLE 10

A projection type active matrix liquid crystal display apparatus was prepared in the same manner as described in Example 8 wherein liquid crystal used for the liquid crystal display elements for respective colors, the average particle diameter and the electrode substrate gap were determined as follows.

Liquid crystal for R: $\Delta n$=about 0.29, $\Delta \epsilon$=about 16, K33 =about 16 ($\times 10^{-12}$N), viscosity $\eta$=about 52 cSt, $R_R$=about 1.6 $\mu$m, $d_R$=10.5 $\mu$m, $A_R$=about 1.8

Liquid crystal for G: $\Delta n$=about 0.24, $\Delta \epsilon$=about 16, K33=about 15 ($\times 10^{-12}$N), viscosity $\eta 32$ about 37 cSt, $R_G$=about 1.6 $\mu$m, $d_G$=10.5 $\mu$m, $A_G$=about 1.8

Liquid crystal for B: $\Delta n$=about 0.24, $\Delta \epsilon$=about 16, K33=about 15 ($\times 10^{-12}$N), viscosity $\eta$=about 37 cSt, $R_B$=about 1.6 $\mu$m, $d_B$=9.5 $\mu$m, $A_B$=about 1.8

These liquid crystal display elements were combined with the projection light source and the projection optical system to thereby form a projection type liquid crystal display apparatus as shown in FIG. 3. When the projection type liquid crystal display apparatus was driven with a video signal having a maximum driving voltage of 8 V in terms of effective value so that a picture image was projected on a screen, a display of moving picture having good chromatic balance and little image-sticking was obtained even in a half tone display. The contrast ratio on the screen was about 120.

The response time was 20 msec under the condition of 8 V→0 V, 20 msec under 0 V→8 V and 100 msec under 0 V=saturated transmittance×0.2 (about 16%).

EXAMPLE 11

Active matrix liquid crystal display elements were prepared in the same manner as in Example 5 except that the counter electrode was made of aluminum to modify the display elements into reflection type elements, and the substrate gaps were respectively $d_R$=6.0 $\mu$m for red, $d_G$=5.0 $\mu$m for green and $d_B$=4.5 $\mu$m for blue. The reflectance at the surface of the liquid crystal display elements was adjusted to be about 0.3%. A projection type active matrix liquid crystal display apparatus was formed with use of the liquid crystal display elements.

When the projection type active matrix liquid crystal display apparatus was driven with a video signal having the maximum driving voltage of 5 V in terms of effective value so that a picture image was projected on a screen, a display of moving picture having good chromatic balance and without residual image and having little image-sticking was obtained. The contrast ratio on the screen was about 100.

The response time was 8 msec under the condition of 5 V→0 V, 12 msec under 0 V→5 V and 80 msec under 0 V→saturated transmittance×0.2 (about 16%).

EXAMPLE 12

An empty cell with color filters of R, G and B formed at the inner surface was prepared. The gap of the empty cell at the red color filter portion was $d_R$=11.5 $\mu$m; the gap at the green color filter portion was $d_G$=10.5 $\mu$m and the gap at the blue color filter portion was $d_B$=10.0 $\mu$m.

Solution obtained by uniformly dissolving acrylate monomer, urethane acrylate oligomer and a photo-cure initiator in a nematic liquid crystal was injected in the empty cell, and the cell was subjected to exposure to UV rays to cure the liquid crystal polymer composite material. Thus, an active matrix liquid crystal display element was prepared. The physical properties of the liquid crystal used were about 0.24 of $\Delta n$, about 16 of $\Delta \epsilon$, about 15 ($\times 10^{-12}$N) of K33 and about 37 cSt of viscosity. Further, the average particle diameter of the liquid crystal was about 1.6 $\mu$m and the aspect ratio in average of the liquid crystal particles was about 1.6.

A black absorbing material was provided at the background of the liquid crystal display element. The display element was driven with a video signal. As a result, a colored display having fine gray scale and little image-sticking was obtained without residual image. The contrast ratio of the liquid crystal display element was about 120.

The liquid crystal display element was combined with the projection light source and the projection optical system to form a projection type display apparatus. By using the projection type display apparatus, a picture image was projected on the screen. As a result, a color display having fine gray scale wherein no residual image and little image-sticking were found, was obtained. The contrast ratio on the screen was about 100.

Thus, the projection type active matrix liquid crystal display apparatus of the present invention uses a liquid crystal display element in which a liquid crystal polymer composite material which electrically controls a scattering state and a transparent state is used as a liquid crystal material, the liquid crystal polymer composite material being held between an active matrix substrate and a counter electrode substrate. Accordingly, polarization plates are unnecessary, whereby the transmittance of light in a light-transparent state can be remarkably improved and a bright picture image is obtainable by projection.

The liquid crystal display element used for the liquid crystal display apparatus of the present invention exhibits high scattering property under the condition that no electric field is applied and high transparent property under the condition that an electric field is applied by means of the active element. Accordingly, it has a high contrast ratio and a display of high brightness is possible even when a conventional driving IC for a TN type liquid crystal display element is used.

The most remarkable feature of the present invention is to reduce the occurrent of image-sticking, i.e. residual image for more than a second.

Further, in the present invention, since the characteristics of the liquid crystal display element are optimized for color light sources which provide different color, a display having good chromatic balance can be obtained even in a half tone. Further, even in gray scale driving, occurrence of an image sticking (a residual image for more than a second) can be suppressed.

Further, in the liquid crystal display element used for the liquid crystal display apparatus of the present invention, since it is unnecessary to use the polarization plates, the wavelength dependency of the optical characteristics is small and there is little requirement for color correction for the light source.

Further, in the liquid crystal display element used for the liquid crystal display apparatus of the present invention, possible problems of orientation processing such as rubbing necessary for the TN type liquid crystal display element and destruction of the active element due to the orientation processing and static electricity generated from the processing can be avoided, and the yield of production of the liquid crystal display elements can be improved significantly.

Since the liquid crystal polymer composite material is formed in a form of film after curing, such problems short-circuiting between the substrates by a pressure applied thereon and destruction of the active elements by displacement of spacers can be minimized.

Further, the liquid crystal polymer composite material is similar in specific resistance to that in the conventional TN mode, and great storage capacitor need not be provided for each picture elements as in the DS mode. Accordingly, designing of the active elements can be facilitated and the ratio of an effective picture element electrode area can be increased, and power consumption of the liquid crystal display element can be small.

Further, since the liquid crystal display element can be produced only by eliminating the orientation film forming step from a conventional process of production of the liquid crystal element of the TN mode, production of the element can be easy.

The liquid crystal display element which employs the liquid crystal polymer composite material has a feature that the response time is short, and a display of moving picture can be made easily. Further, since the electricoptical characteristics (voltage-transmittance dependence) of the liquid crystal display element is looser than a conventional liquid crystal display element of the TN mode, it can be easily applied to display gray scale.

In addition, since in the liquid crystal display element of the present invention, light is scattered by a portion to which no electric field is applied, there is no leak of light upon projection of light even if a light shielding layer for interrupting light is not provided at the portion other than picture elements. Accordingly, there is no necessity of provision of a light shielding means between adjacent picture elements. Accordingly, where an active element made of polysilicon is used, a projection light source of a high brightness can be used without using a light shielding layer or with a thin light shielding layer to the active element, whereby a projection type liquid crystal display apparatus of a high brightness can be easily obtained. Further, no light shielding layer is necessary in this instance, and accordingly, the process of production can be simplified.

In the present invention, various applications are possible as far as the effect by the present invention is not injured.

What is claimed is:

1. An active matrix liquid crystal display element comprising an active matrix substrate having an active element for each electrode for picture element, a counter electrode substrate provided with a counter electrode and a liquid crystal polymer composite material in which a nematic liquid crystal having a positive dielectric anisotropy is dispersed and held in a polymer matrix, said liquid crystal polymer composite material being held between the active matrix substrate and the counter electrode substrate wherein the refractive index of the polymer matrix substantially agrees with the ordinary refractive index ($n_0$) of the liquid crystal used, characterized in that the refractive index anisotropy $\Delta n$ of the nematic liquid crystal used is 0.18 or higher, and the average particle diameter $R(\mu m)$ of the liquid crystal dispersed and held in the polymer matrix, the aspect ratio A in average of liquid crystal particles, and the specific dielectric anisotropy $\Delta\epsilon$, the elastic constant $K_{33}(10^{-12}N)$ and the viscosity $\eta$ (cSt) of the liquid crystal satisfy the following relations:

$$3(K_{33}/\eta)^{0.5} > R/A > 0.7(K_{33}/\Delta\epsilon)^{0.5} \qquad (1)$$

and $$1.3 < A < 2.3 \qquad (2)$$

and that in a plane cut in the direction perpendicular to the surface of the electrodes on the liquid crystal polymer composite material, the direction of the long axis of each liquid crystal particle is substantially random in the two-dimensional space.

2. The active matrix liquid crystal display element according to claim 1, wherein the direction of the long axis of each liquid crystal particle in the liquid crystal polymer composite material is substantially random in the three-dimensional space.

3. The active matrix liquid crystal display element according to claim 1, wherein the following relation:

$$0.2 < R \cdot \Delta n < 0.7 \qquad (3)$$

is satisfied.

4. The active matrix liquid crystal display element according to claim 1, wherein the following relation:

$$(\Delta n^2 \cdot \Delta\epsilon)/(K_{33} \cdot \eta) > 0.0011 \qquad (4)$$

is satisfied.

5. The active matrix liquid crystal display element according to claim 1, wherein the following relations:

$$4R < A \cdot d < 15R \qquad (5)$$

and $$0.8R \cdot V < A \cdot d < 1.8R \cdot V \qquad (6)$$

where V is the maximum effective voltage (V) applied to the liquid crystal polymer composite material and d is the gap between the picture element electrode and the counter electrode, are satisfied.

6. The active matrix liquid crystal display element according to claim 1, wherein a curable compound used for the liquid crystal polymer composite material is a photo-curable compound, and the liquid crystal polymer composite material obtained by irradiating light to a composition of the liquid crystal and the photo-curable compound to thereby cure the compound, is used.

7. The active matrix liquid crystal display element according to claim 6, wherein the liquid crystal polymer composite material obtained by irradiating light to a solution obtained by uniformly dissolving the liquid crystal and the photo-curable compound to thereby cure the compound, is used.

8. The active matrix liquid crystal display element according to claim 1, wherein a composition of the liquid crystal and a curable compound is held between the two substrates, and wherein liquid crystal particles are formed in a non-spherical shape by utilizing the shrinkage of the polymer at the curing and the long axis of the particles directs substantially random directions.

9. The active matrix liquid crystal display element according to claim 1, wherein a color filter having a color selected from a plurality kinds of color is disposed at each picture element to thereby provide a multi-color display as a whole.

10. The active matrix liquid crystal display element according to claim 9, wherein a single element is provided with R, G and B color filters, and the electrode gap $d_x$ (μm) for each color ($d_G$ represents the electrode gap of the active matrix liquid crystal display element for green light) and the main wavelength $\lambda_x$ (μm) of each color satisfy the relation:

$$4R < A \cdot d_G < 15R \tag{5A}$$

and wherein at least two colors among the R, G and B colors satisfy the relation:

$$D_i^2/\lambda_i \approx d_j^2/\lambda_j \tag{7}$$

where $i \neq j$, and i and j represent either among R, G and B colors.

11. The active matrix liquid crystal display element according to claim 10, wherein the following relation:

$$0.2 < R \cdot \Delta n < 0.7 \tag{3}$$

is satisfied.

12. The active matrix liquid crystal display element according to claim 10, wherein the following relation:

$$(\Delta n^2 \cdot \Delta \epsilon)/(K33 \cdot \eta) > 0.0011 \tag{4}$$

is satisfied.

13. A projection type active matrix liquid crystal display apparatus which comprises a projection light source, a projection optical system and the active matrix display element as claimed in claim 1.

14. A projection type active matrix liquid crystal display apparatus comprising a plurality of color light sources, a plurality of active matrix liquid crystal display elements for receiving light from each of the color light sources and a projection optical system which synthesizes and projects light emitted from the active matrix liquid crystal display elements, characterized in that each of the active matrix liquid crystal display elements comprises an active matrix substrate having an active element for each electrode for picture element, a counter electrode substrate provided with a counter electrode and a liquid crystal polymer composite material in which a nematic liquid crystal having a positive dielectric anisotropy is dispersed and held in a polymer matrix, said liquid crystal polymer composite material being held between the active matrix substrate and the counter electrode substrate provided with the counter electrode, and the refractive index of the polymer matrix substantially agreeing with the ordinary refractive index ($n_0$) of the liquid crystal used; that the average particle diameter $R_x$ (μm) of the liquid crystal corresponding to each color, which is dispersed and held in the polymer matrix, the aspect ratio A in average of liquid crystal particles, the specific dielectric anisotropy $\Delta \epsilon_x$, the elastic constant K33 $_x(10^{-12}N)$, the viscosity $\eta_x$(cSt) and the refractive index anisotropy $\Delta n_x$ of the liquid crystal, the gap $d_x$ (μm) between the counter electrode and the picture element electrode, and the dominant wavelength $\lambda_x$ (μm) of each of the colors satisfy the following relations:

$$3(K33_x/\eta_x)^{0.5} > R_x/A_x > 0.7(K33_x/\Delta \epsilon_x)^{0.5} \tag{1A}$$

and $$1.3 < A_x < 2.3 \tag{2A}$$

wherein at least a pair of the active matrix liquid crystal display elements satisfies the relations:

$$(\Delta n_i \cdot R_i)/A_i \cdot \lambda_i \approx (\Delta n_j \cdot R_j)/(A_j \cdot \lambda_j) \tag{8}$$

and $$d_i/R_i \approx d_j/R_j \tag{9}$$

wherein $i \neq j$, and i and j represent either color, or it satisfies the relation:

$$\Delta n_i \cdot d_i^2/\lambda_i \approx \Delta n_m \cdot d_j^2/\lambda_j \tag{10}$$

where i and j are described above; and that in a plane cut in the direction perpendicular to the surface of the electrodes on the liquid crystal polymer composite material, the direction of the long axis of each liquid crystal particle is substantially random in the two-dimensional space.

15. The projection type active matrix liquid crystal display apparatus according to claim 14, wherein said color light sources are R, G and B color light sources, x satisfies both the equations (1A) and (2A) for each of the R, G and B colors, and wherein the relations:

$$(\Delta n_R \cdot R_R)/(A_R \cdot \lambda_R) \approx (\Delta n_G \cdot R_G)/(A_G \cdot \lambda_G \approx (\Delta n_B \cdot R_B)/(A_B \cdot \lambda_B) \tag{8A}$$

and $$d_R/R_R \approx d_G/R_G \approx d_B/R_B \tag{9A}$$

are satisfied, or the relation:

$$\Delta n_R \cdot d_R^2/\lambda_R \approx \Delta n_G \cdot d_G^2/\lambda_G \approx \Delta n_B \cdot d_B^2/\lambda_B \tag{10A}$$

is satisfied.

16. The projection type active matrix liquid crystal display apparatus according to claim 14, wherein the refractive index anisotropy $\Delta n_x$ of the liquid crystal used for the active matrix liquid crystal display element, satisfies the relation of $\Delta n_j \leq \Delta n_i$ when $\lambda_i > \lambda_j$ is assumed.

17. The projection type active matrix liquid crystal display apparatus according to claim 14, wherein an active matrix liquid crystal display element which satisfies the relation:

$$0.2 < R_x \cdot \Delta n_x < 0.7 \tag{3A}$$

is used.

18. The projection type active matrix liquid crystal display apparatus according to claim 14, wherein an active matrix liquid crystal display element which satisfies the relation:

$$(\Delta n_x^2 \cdot \Delta \epsilon_x)/(K33_x \cdot \eta_x) > 0.0011 \tag{4A}$$

is used.

19. The projection type active matrix liquid crystal display apparatus according to claim 14, wherein the following relations:

$$4R_x < A_x \cdot d_x < 15R_x \tag{5A}$$

and $$0.8R_x \cdot V_x < A_x \cdot d_x < 1.8R_x \cdot V_x \tag{6A}$$

where $V_x$ is the maximum voltage (V) applied to the liquid crystal polymer composite material, are satisfied.

* * * * *